United States Patent [19]

Wallace et al.

[11] 4,228,685

[45] Oct. 21, 1980

[54] METHODS FOR COMPUTER ASSISTED OPTIMIZATION OF MEAT CUTS FROM CARCASSES

[75] Inventors: Charles H. Wallace, Carrollton; Richard W. Moncure, Hayes, both of Va.

[73] Assignee: International Telephone and Telegraph Corporation, New York, N.Y.

[21] Appl. No.: 51,311

[22] Filed: Jun. 1, 1979

Related U.S. Application Data

[63] Continuation of Ser. No. 857,324, Dec. 5, 1977, abandoned.

[51] Int. Cl.³ ...................... G01D 21/02; G01F 15/46

[52] U.S. Cl. .................................. 73/432 R; 364/475

[58] Field of Search ............ 73/432 R; 364/105, 403, 364/408, 475, 468, 478

[56] References Cited

U.S. PATENT DOCUMENTS

| | | | |
|---|---|---|---|
| 3,320,618 | 5/1967 | Kuch et al. | 73/53 X |
| 3,940,998 | 3/1976 | Sourby | 73/432 R |
| 4,027,246 | 5/1977 | Cacoma | 364/468 |
| 4,118,777 | 10/1978 | Wallace | 73/432 R |

*Primary Examiner*—S. Clement Swisher

*Attorney, Agent, or Firm*—John T. O'Halloran; Alfred C. Hill

[57] ABSTRACT

There is disclosed herein a method for optimizing the cuts produced from a carcass, for example a pork carcass, which is an improvement over the subject matter of U.S. Pat. No. 3,940,998. The improvements described are achieved by identifying each carcass with an indicia at the time of the kill; making physical measurements and a subjective evaluation score of the carcass, after dressing, which are automatically input as data to a computer programmed to determine the optimum cutting instructions for each carcass in order to achieve maximum value from the resulting cuts in accordance with market conditions.

19 Claims, 1 Drawing Figure

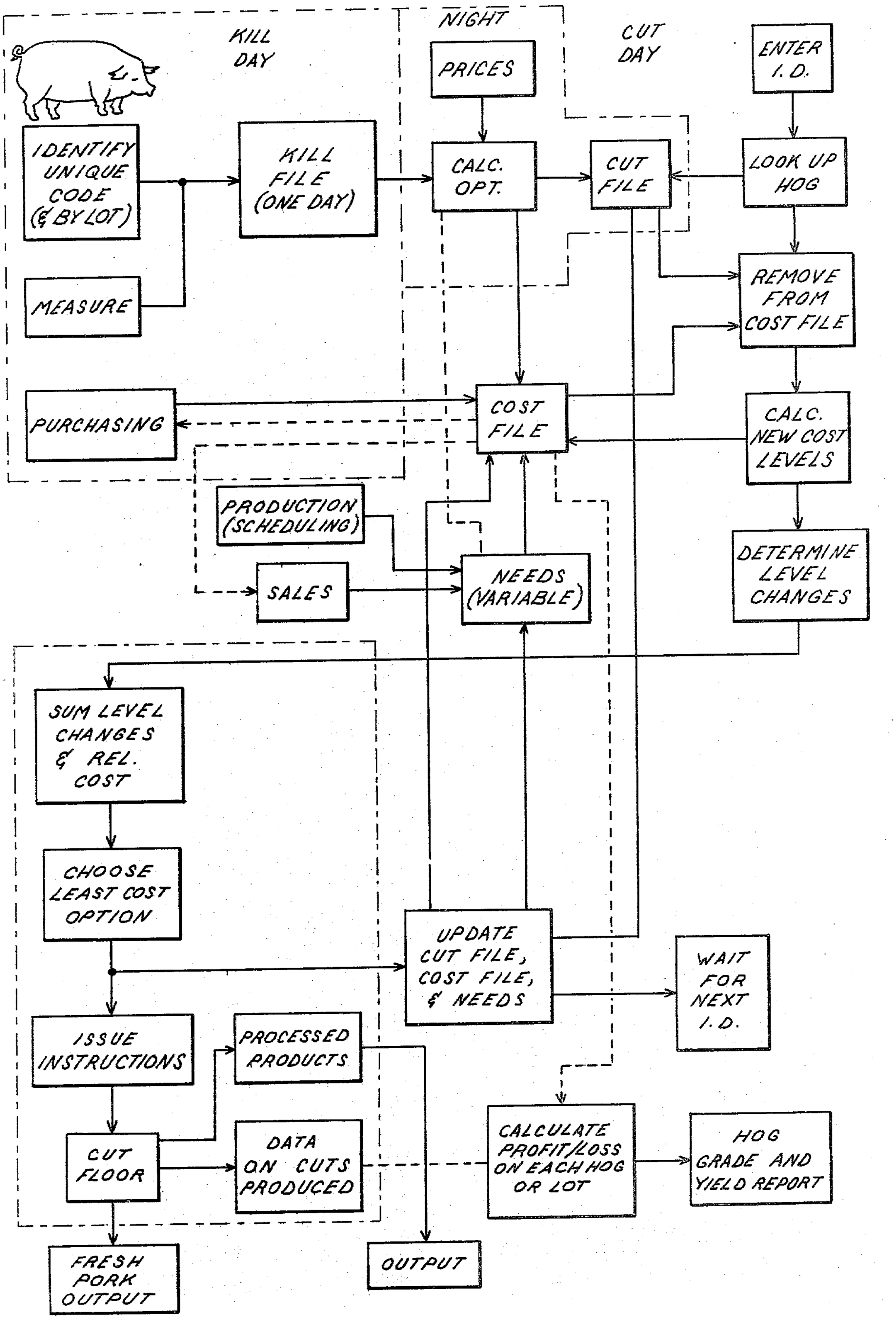
KILL DAY
NIGHT
CUT DAY
IDENTIFY UNIQUE CODE (& BY LOT)
MEASURE
KILL FILE (ONE DAY)
PRICES
CALC. OPT.
CUT FILE
ENTER I.D.
LOOK UP HOG
REMOVE FROM COST FILE
CALC. NEW COST LEVELS
DETERMINE LEVEL CHANGES
PURCHASING
COST FILE
PRODUCTION (SCHEDULING)
SALES
NEEDS (VARIABLE)
SUM LEVEL CHANGES & REL. COST
CHOOSE LEAST COST OPTION
UPDATE CUT FILE, COST FILE, & NEEDS
WAIT FOR NEXT I.D.
ISSUE INSTRUCTIONS
PROCESSED PRODUCTS
CUT FLOOR
DATA ON CUTS PRODUCED
CALCULATE PROFIT/LOSS ON EACH HOG OR LOT
HOG GRADE AND YIELD REPORT
FRESH PORK OUTPUT
OUTPUT

METHODS FOR COMPUTER ASSISTED OPTIMIZATION OF MEAT CUTS FROM CARCASSES

CROSS-REFERENCE TO RELATED APPLICATIONS

This is a continuation application of application Ser. No. 857,324, filed Dec. 5, 1977 (now abandoned).

BACKGROUND OF THE INVENTION

This invention relates to improvements in methods for use in meat animal slaughtering processing plants and more particularly to a method for use in a hog slaughtering plant which optimizes the value of the resulting cuts made from each carcass of a series or plurality of carcasses (the number of carcasses in a purchased lot or processed in a given period of time, such as a day) under existing market conditions as well as providing management with a tool by which each animal or hog can be evaluated in terms of profit or loss based on the total operation (the number of carcasses processed in the given period of time) from purchase of the animal to sale of the resulting products.

The process described in U.S. Pat. No. 3,940,998, includes making physical measurements of the ham circumference, body length, fat depth and a subjective evaluation of muscle quality. These are utilized to provide data to a computer which in accordance with the algorithm set forth, predicts the weight or range of weights of the ham/loin cuts which can be produced and issues instructions as to the point with respect to the aitch bone for the butcher to cut each individual hog carcass to optimize the value under existing market price conditions of the resulting ham/loin cut from each individual hog carcass without regard to the other carcasses to be processed in a given period of time, such as a day. The subject matter taught in the U.S. patent required that the data be collected at the time the carcass, split into halves, left the cooler and entered the cutting department. The physical data, i.e. the weight, ham circumference, body length, fat depth measurements as well as the subjective muscle quality score were all entered as the carcass proceeded toward the cutting table. The data fed to the computer was operated on by the computer in accordance with the algorithm and results in cutting instructions displayed to a butcher in terms of a digital read out giving the distance from the aitch bone at which a scribe mark was to be placed on the carcass, which acted as an instruction to the butcher as to precisely where to make the cut to divide the ham from the loin.

Subsequent improvements, as described in commonly assigned copending application Ser. No. 714,875, filed Aug. 16, 1976 of C. H. Wallace, now U.S. Pat. No. 4,118,777, issued Oct. 3, 1978, resulted in utilizing the computer's solution to position a light line or a shadow on each carcass (in addition to the visual digital display) which delineates the point to which the butcher was to make the desired cut to optimize the ham/loin as well as to optimize the value of the loin/shoulder cut.

In practice, it has been proven that the subject matter as contained in U.S. Pat. No. 3,940,998 and in the aforesaid application Ser. No. 714,875 have resulted in considerable improvement in the profitability of hog processing plants utilizing the subject matter taught therein.

As pointed out in the earlier patent and application, the value which can be obtained from each individual carcass requires that each carcass, specifically hogs, as described herein, must be considered, not as a group in purchase lots in terms of weights and quality grades, but each hog carcass must be considered individually. The yield potential from each carcass should be analyzed in accordance with the relative value of the various cuts based on current market values, giving due consideration to the market value of the various weight ranges of each primal cut and to the fact that the yield potential of most can be varied by the point of demarcation and still stay within customary trade practice. Furthermore, many processing plants have a further demarcation in the products which they produce which arises from a variety of trim instructions so that either a "commodity" trim, which permissibly contains a considerable amount of fat, or a leaner trim (called "Gwaltney" herein) which contains considerably less fat can be produced from the same carcass and even certain portions of an individual carcass can be broken into the primal cuts, some of which can be trimmed to produce "commodity" cuts and others can be trimmed to produce the "lean", "specialty" cuts. The matter is further compounded by the fact that certain cuts may be sold bone-in and other cuts may be sold bone-out or boneless and again the primal cuts produced from each carcass may vary as to how they are trimmed both for the bone-in and boneless cuts.

As a further desirable goal it is important for the management of a processing plant to be able to determine to the extent possible, the profit and loss which results from each carcass. Therefore, if it is possible by experience to determine the relative profit or loss with respect to each carcass, it is possible then to tailor the buying procedures in such a manner as to achieve maximum profit with respect to each carcass. By being able to determine, as taught by the method of this invention, the results produced by each individual hog carcass being cut up and sold, it is possible to revise the standard procedures used in the industry with respect to hog buying discounts for both grade and yield to reflect conditions in the market for all the products produced.

Many processing plants currently use, as a management tool, a hog grade and yield report. As currently practiced in the industry this is essentially a comparison of the weight and grade of the hogs purchased and the prices paid, and the total yield value based on the daily top of the market prices for certain market centers for number one grade 200 lb. to 240 lb. weight range hogs. As an example, one hog processing plant utilizes a following type of discount schedule.

| WEIGHT RANGE | AMOUNT OF DISCOUNT |
|---|---|
| 0/160# | $10.00 per cwt discount from 200/240 |
| 161/180 | 5.00 |
| 180/190 | 1.00 |
| 190/200 | .50 |
| 200/240 | .00 |
| 240/250 | .50 |
| 250/260 | 1.00 |
| 260/270 | 2.00 |
| 270/300 | 5.00 |
| Heavier Weights N/A (not applicable) | |
| GRADE DISCOUNTS STARTING WITH NO. 1 TOP GRADE | |
| $ .00 No. 1 | Top of Market if 200/240# |
| .85 No. 2 | |
| 2.00 No. 3 | |

-continued

| WEIGHT RANGE | AMOUNT OF DISCOUNT |
|---|---|
| 3.00 No. 4 | |
| 5.00 Mutilated | |

It will be noted that the discount schedule creates the possibility of 45 different prices on a given day and in practice, on an average day 30 different prices are used.

Hog cut out losses are the most serious problems which have plagued the hog killing process for the industry. While the discount policy varies from plant to plant, it is relatively standard in the industry. The prices ignore the prices of the primal cuts which will be produced when the various hogs in the weight/grade ranges are cut out. The provision market is extremely volatile with both daily and seasonal trends. Heavy hams from heavy hogs frequently sell at the same price as hams from the 200 to 240 lb. hogs. The most desirable slicing bellies are produced from 240 to 260 lb. hogs and weigh between 12 to 14 lbs. They are priced at a higher price than 8 to 10 and 10 to 12 lb. pork bellies. On many occasions, the 14 and down pound loins and 14 to 17 pound loins command the same price. By utilizing data produced, as a result of the subject matter of this invention, a thorough analysis of individual hog profit or loss results establishes that frequently there is a profit on 240 to 250 lb hogs and 250 to 260 lb hogs and a loss on 200 to 240 lb. hogs. While it is unlikely that the following of the methods as taught in this application will result in altering the industry buying practices, it is an object of this invention to utilize the existing flaws in the system to minimize the losses and, to the extent possible, optimize profits.

Basically current grade discounts are more realistic as they recognize quality and fat. The subject matter of this invention provides an opportunity to improve upon cut out results since it is now possible to treat differently an extremely lean hog which will have a belly so thin that it will not produce sliced bacon. It would be impossible to calculate individual hog cut out results on the range and volume of hogs slaughtered per year without utilizing the techniques as taught by the subject matter of this invention.

As has been pointed out in the U.S. Patent No. 3,940,998, the value of hog cuts must be calculated daily utilizing current market values for each cut. The market value of each cut in turn is based on the cut weight and all cuts within a given weight range have the same market value. Accordingly, the desired weight of each of the primal cuts and each of the various trims whether boneless or bone-in should be determined to produce the maximum return based on current market conditions by establishing the exact points of demarcation between each primal cut; determining whether the primal cut should be a "commodity" trim or "Gwaltney" trim; and by determining whether the cut should be sold boneless or bone-in. To a considerable extent each day's slaughter which will be cut the following day or within a day or so must satisfy existing market demand. Thus, the demand on any given day that the cut-up product is sold will vary and in fact may even vary during the day's cutting operations, depending upon sales conditions.

SUMMARY OF THE INVENTION

The improvement as taught by this application provides for a method by which each individual carcass is identified immediately following the killing of the animal and after it has been dehaired, singed and polished. The physical data of the carcass, after it is identified with a discrete indicia, is obtained at the kill department level rather than the cutting department level. Previously, and as taught by U.S. Pat. No. 3,940,998, the solution to the matter of determining the line of demarcation between the ham/loin or shoulder/loin cuts was determined in milliseconds, just before the actual cutting. As such, the data provided little by way of current information useful to management as a tool in operating the processing plant to achieve maximum profits and to minimize losses.

By identifying each carcass and collecting the physical and quality data at the kill department level, it is now possible to put into the computer information relating, not only to existing provision market price conditions in the form of the value of the different predicted weight grades of hams, loins and shoulders but it is also possible to program demand based on sales with respect to each cut already made or needed during the process of cutting the previous day's kill. It is also possible to put into the computer data as to the demand for the various trims so that the computer can solve the algorithm and produce cutting instructions so that the current demand will be satisfied based on the existing hogs to be cut and to achieve the maximum of profits of each individual carcass. It is then possible, once the cut-out has been achieved, to collect the data as to the cut-out and the actual sales to determine the profit and loss with respect to each carcass. Utilizing that information to review the hog grade and yield report, management can minimize loss and maximize profits starting from the point of purchase of the hogs through the sale of the results of the cut-out.

Accordingly, it is a feature of the present invention to provide a method of optimizing the value obtained from each hog carcass of a plurality or series of hog carcasses to be processed in a given period of time which comprises the steps of identifying each carcass promptly after the kill, determining the physical variables with respect to each of the plurality of carcasses in the killing department, supplying the identification and physical variables of each of the plurality of carcasses to a computer and storing it, putting into the computer market indicator and production information, and utilizing the computer to determine the optimum cutting instructions for each of the primal cuts in terms of desired trim and optimizing the value of each individual carcass under existing market conditions.

BRIEF DESCRIPTION OF THE DRAWING

The above mentioned and other features and objects of this invention will become more apparent by reference to the following description taken in conjunction with the accompanying drawing in which the single FIGURE is a block diagram of a system for implementing the method in accordance with the principles of the present invention.

DESCRIPTION OF THE PREFERRED EMBODIMENT

In accordance with U.S. Pat. No. 3,940,998 hog fabrication is the term applied to the process of cutting hog carcasses into parts that are sold at the wholesale level. The cuts are cut from whole hog carcasses in nearly an identical manner, with the variation in the characteristics of the individual hog being taken into account only for purposes of optimizing the value of the ham/loin cut under existing provision wholesale price ranges depending upon the weight range for each of the primal cuts. While the method as described in U.S. Pat. No. 3,940,998 has been eminently successful, its teachings are necessarily limited. In the method described in the cited patent the hog cuts are produced having the maximum value by taking into account the variation in key hog carcass characteristics and issuing butchering instructions automatically as taught therein. Thus, in the given market situation the value of a cut varies with its size (weight) and a particular size (weight) cut is quite often more valuable on any given day which permits the line of demarcation to be made and still keep within permissible industry practice.

As taught by the above cited patent each hog carcass is cut in such a way as to produce primal cuts having the greatest demand or value in the market place on that date by determining the physical characteristics and quality of each carcass as it enters the cutting floor from the chilling chamber.

In accordance with the present invention, the entire identification and recording of the physical characteristics and the quality characteristics of each carcass of a plurality of carcasses is obtained at the kill floor level, in other words prior to the chilling. One of the essential reasons for positively identifying each carcass at as early a stage as possible in order that its identifying indicia can accompany the carcass throughout the entire process until the point at which that carcass is cut in accordance with computer generated instructions is to maximize the profit with respect to each carcass of the plurality of carcasses and as a result thereof the overall day's processing of the plurality of carcasses is optimized.

One way of identifying each carcass which has proved to be particularly efficacious is to utilize the automatic self-indexing branding device as taught in copending application Ser. No. 709,471, filed July 28, 1976 of C. R. Smith entitled "Electrical Sequential Numerical Branding Apparatus".

Since the positive identification of each carcass is critical to the process of this invention it is also important to provide a back-up or redundant identification means. One such means is the industry standard practice of an ink tatoo. Any other means which could identify each individual carcass by a discrete indicia is suitable and may also include an identity code including the purchase lot and grade. Similarly, another means which has been successfully employed is the utilization of bar code plates which are attached to the hook or gambrel on which each carcass is carried by a conveyor system which remains with the hog until the carcass reaches the cutting floor and is broken into its various parts. Such a bar code system is advantageous since automatic readers can be utilized to generate the identification data for each carcass and therefore positively identify that carcass in the computer memory.

Preferably, following the stunning and bleeding of the hog it is identified by a tatoo containing lot number information and it is branded with a sequential number and/or a unique label or bar code plate affixed to the gambrel or hook carrying the individual carcasses on the continuous conveyor. It is then dehaired, singed and polished. At a station following the dehairing, singeing and polishing operation, a pre-evisceration scale is associated with the conveyor carrying the carcass. At this point inputs to the computer system are provided manually or automatically to record, with respect to each carcass, its pre-evisceration weight, the brand number, the lot number and the bar code or tape label number.

Next the carcass is eviscerated and split. For various reasons some of the carcasses may be forced out of the general sequence due to quality grading problems prior to the entry of the split carcass into the cooler. The remainder of the hogs are then ready for transport into the cooler.

A station is next provided, prior to the carcasses' entry to the cooler, at which the indicia is automatically read into the computer and each carcass is evaluated for muscle score, which is a subjective observation made by a skilled technician who visually evaluates the carcass in terms of muscle score.

It is possible by observing the information recorded by each individual technician to determine a constant for each technician, since each technician will tend to uniformly grade muscle scores in a slightly different way from other technicians. By determining the constant for each technician, it is possible to take into account that individual's level of grading skill so that the input of the subjective quality of muscle score can be relatively standard for all hogs processed.

Accordingly, just prior to the entry into the chilling chamber the technician will manually record the bar code (if not input automatically) or brand indicia and a muscle score (which may be corrected by correction factors, such as multiplying the muscle score by a coefficient or constant). He also may, in certain instances, enter a characteristic code which will identify the hogs with tuberculosis, which are mutilated, condemned (if not previously removed), sows or which otherwise require special treatment.

The resulting data is automatically fed to the computer and stored with respect to each hog. Next an operator utilizing tools similar to that described in U.S. Ser. No. 666,846, filed Mar. 15, 1976 of R. J. Sumption and C. H. Wallace, entitled "Method and Apparatus for Measuring Carcasses", now U.S. Pat. No. 4,071,957, issued Feb. 7, 1978, determines the circumference of the ham and the body length, which physical data is automatically put into the computer for each carcass. It should be noted at this point that the carcass is still "hot" and it may be necessary to take into account the flaccid condition of the ham which may cause a slight indentation, as compared to measuring the circumference of a chilled ham. Practice has indicated that this is a relatively constant factor which can be taken into account by utilizing correction factors for the actual circumference measurements, such as a coefficient or constant multiplier for the actual circumference measurement.

Immediately following there are one or more operators, utilizing fat depth measurement tools, which may be of the type described in U.S. Pat. No. 3,940,998, making fat depth measurements, typically three for each carcass, and the resulting data is fed to the computer memory. In a plant having a high production rate it may be necessary to utilize two operators utilizing two tools to take three measurements of the fat depth at the last lumbar, the last rib and the first rib. In some plants it may be possible to use a "MAN LIFT DEVICE" as described in a copending application of C. H. Wallace, Ser. No. 889,713, filed Mar. 24, 1978 to assist in making the desired measurements.

Again it will be appreciated that the individual measurements made by individual operators tend to be relatively constant and variations as between operators of the tools can be multiplied by a multiplication factor coefficient or constant so that relatively standard data is provided as the output from the tools and the input to the computer memory.

The ham circumference, body length and fat depth measurements are objective physical measurements of each individual hog.

It is also possible at this point in time since the hogs are about to enter the cooler to allow for a sorting of the carcass into various locations in the cooler such that the fat hogs will tend to be directed into one section of the cooler, the lean hogs into another section of the cooler and the medium hogs into a third section of the cooler. This is possible, since, by utilizing a separate hot hog scale just prior to the hog carcass being conveyed into the cooler and the fat depth measurements, a digital or colored light display can be provided which would act as instructions to operators to route fat, lean and medium hogs into different sections of the cooler.

At this point in time, the computer memory contains, with respect to each carcass, identifying indicia for each in terms of lot number, brand, and/or bar code of each hog; pre-evisceration and hot weights, along with its muscle score subjective measurement and the physical measurements of ham circumference, body length and three fat depth measurements. At this point the carcass then enters the cooler and may, if desired, enter into a section of the cooler in which groups of hogs of fat, lean or medium categories are located. Thus all of the data needed to identify each carcass is stored in the computer and is available for use during the period of time that the hogs are being subjected to the necessary chilling operation.

Accordingly all of the hogs killed on any given day are identified positively and all of the physical and subjective measurements are entered into a KILL FILE. At the same time or during the evening, marketing data which has current provision (PRICES) for the primal cuts for the various trims and demand (NEEDS) are entered into the computer based on data received from the (SALES) marketing and PRODUCTION (scheduling) departments. During the time from a one day's kill to the entering of the next day's cut operation the computer, calculates all of the options (CALC. OPT.) available, predicting the weight ranges of the cuts that can be produced from each carcass and which will satisfy demand at the maximum profit for each individual carcass and produces a CUT FILE, as well as a COST FILE which is the cost to the producer if, because of deviations from the optimum required by demand, etc. the optimum cuts cannot be produced.

In addition to the physical measurements and subjective data of each hog carcass contained in the computer's KILL FILE the options may be calculated utilizing (COST FILE) cost information. Thus there may be an additional input into the computer's operation to calculate the available options which is information based on the cost of each hog which data (PURCHASING) is obtained from the purchase lot by applying the discounts as typically calculated in accordance with the description contained above. On the other hand cost data may be used in a reverse manner, i.e. only to compare the actual discounted cost versus the predicted weights of the cuts optionally available so as to adjust buying practices.

Since there is a substantial period of time during which the carcasses are held in the chilling chamber, the block diagram indicates that the calculation and preparation of the CUT FILE can take place during the NIGHT period. Of course, where rapid chilling techniques are used, for example, as described in U.S. Pat. No. 3,814,814 it is possible that the CUT FILE can be prepared on a current basis or during a much shorter time period.

Once the CUT FILE has been completed the information is available and ready for the beginning of CUT DAY operations.

At the start up of the cutting operations as each carcass or side thereof is carried out of the chilling chamber, typically on a overhead conveyor, the identification of each side is entered into the computer utilizing the brand indicia, the bar code or such other indicia which may be employed to identify that specific individual carcass. At this point the identification enters a look-up table (LOOK UP HOG) to identify that individual carcass in the CUT FILE. Once located that individual carcass is removed from the CUT FILE and the carcass is also at the same time removed from the COST FILE. At this point of time new cost levels are calculated and level changes are determined. As the various carcasses are processed the sum of level changes and relative cost calculations are performed and the computer selects the least cost option for the specific carcass which is being carried to the cutting table. At this point in time the computer issues cutting instructions to the cutting floor which may be in the form of visual displays or may be in the form of positioning a light line or shadow at a distance from a reference point on the carcass when positioned on the cutting table. Once the optimum solution has been arrived at and instructions issued, then each of the various files is updated, in other words, the CUT FILE is updated to remove the carcass since it is no longer available, the COST FILE is revised and since a proportion of the needs are to be satisfied with that individual carcass the NEEDS FILE is updated. The system then proceeds systematically to process each carcass by issuing instructions to the cutting floor utilizing the same series of steps, in each case initiated by the next identification indicia of the next carcass entering the cutting floor from the chilling chamber.

In one form in which the solutions are presented to the cutting floor, the light line or shadow to direct the ham/loin cut and the shoulder/loin cut and lights and/or indicia are used to designate the various trim grades and to designate whether any particular cut is to be processed as a bone-in or boneless cut.

It will be seen from the above that one of the essential elements is the positive identification of each carcass from the time the animal is stunned and killed until it is completely cut into its optimum value parts to satisfy current needs. As indicated before it is preferable to use a multiplicity of identification means so that a breakdown of any one system does not result in loss of the critical identifying indicia for each carcass. Thus it is quite possible to use the electrical hot branding of an indicia, more traditional ink tatoos and the bar code or tape label physically attached or mechanically held to the gambrel which carries the carcass from the dehairing area until the carcass is placed on the cutting table.

By way of illustrating the practical application of the method of the invention, it should be appreciated that any given hog processing plant will produce a variety of trims. For example, any primal cut may either be a "Commodity" cut, for example a Commodity ham, a Commodity loin and each of those may further be divided into other categories such as boneless, bone-in water added or other specialty product such as a "Smithfield" ham or the like. Thus, it will be seen that with respect to each carcass there are a total of at least six options for the ham cut from that carcass, just taking into account the generalities of "Commodity" versus "Gwaltney" cuts for the ham/loin and whether or not the resulting cuts are to be bone-in or boneless.

Thus the minimum number of options to be calculated is 6 and the maximum number is 12. One of the first steps after the KILL FILE has been produced, is to calculate the 12 best options for each hog, ensuring that all of the feasible trim combinations are represented at least once. Thus, in the table of Options Calculated (CALC. OPT.) there will be at least one combination of Commodity ham-Commodity loin; Gwaltney ham-Commodity loin; Commodity ham-Gwaltney loin; Gwaltney ham-Commodity loin; Commodity ham-bladeless loin; and Gwaltney ham-bladeless loin. The best options are those which provide the highest dollar value for that hog regardless of the needs or requirements.

The relative cost is determined by subtracting the dollar value of all of the options from the dollar value of the best option for that particular hog.

The next step is to calculate a weighting factor for each trimmed ham and loin by weight range. The weighting factor calculated is equal to the reciprocal of the number of hams/loins in a particular weight range with a particular trim which occur in the options for each individual hog carcass. For example, when three Commodity hams in the 17/20 pound weight range are contained in the options for a hog, the weighting factor is equal to $\frac{1}{3}$ or 0.33 for the 17/20 Commodity hams for that hog. Two Gwaltney loins in the 14/down weight range would yield $\frac{1}{2}$ or 0.5 as the weighting factor.

Once the options have been calculated and the weighting factors have been determined for all the hogs, Cost Distribution Tables for hams and loins are constructed for all of the options for all hogs at the weight factors including, as appropriate elements of the ham/loin cost tables, weight ranges, trim and relative cost.

The next step, utilizing the ham and loin needs tables and cost tables, is the calculation of estimated initial costs to satisfy initial needs in the following manner. For each trim and weight range for hams and loins, sum the values in the corresponding column from top to bottom in the cost table until the sum equals or exceeds the need for that trim and weight range. If the sum does not equal or exceed the needs, then the cost level should be set at 40. The row number containing the last value added is the cost level for that trim and weight range. If the needs for any trim or weight range is zero then the cost level is arbitrarily set to a large negative value, for example −100.

As practical illustrations of the above calculations "Maximum Hams Available by Relative Cost" and "Maximum Loin Available by Relative Costs" tables and a combined "KILL CUT FILE" are attached hereto in the form of Appendix A. These are illustrative examples of a computer print out based on 14 hogs which were killed on Aug. 26, 1977 in which each of the 12 possible options have been calculated for the 14 hogs. In addition, there is also attached as Appendix B a CUT FILE Data Record which identifies the various data items contained in the KILL FILE-CUT FILE attached as part of Appendix A. It will be appreciated that the 14 hogs selected for the purpose of illustration is a small portion of any single day's kill in a good size pork packing operation, however, as the size of the sample utilized increases the statistical accuracy improves.

Once the Tables and KILL and CUT FILES have been prepared, as illustrated by Appendix A, the system is ready to be utilized to issue cutting instructions with respect to each individual carcass. As indicated above, as a carcass leaves the chilling chamber it is identified by means of its identifying indicia and the data relative to that hog is looked up and is removed from the cost tables. The weighting factors for these carcass options will be subtracted from both the HAM and LOIN cost tables by trim, weight range and relative cost.

The next step is to recalculate the cost levels in order to determine the effect of that carcass being removed from the total resources available during that "CUT DAY". Next the COST LEVEL CHANGES are calculated and relative costs are subtracted from the new cost levels to get a "replacement cost", which is, for example, the new cost level for hams minus its relative cost and a new cost level of loins minus relative cost, i.e., REPLACEMENT COST=NEW COST LEVEL HAMS−REL COST; REPLACEMENT COST=NEW COST LEVEL LOINS−REL COST.

The next step is to calculate the "combined cost" of choosing an available given option. This "combined cost" is equal to the relative cost minus the new cost level for hams minus the relative cost and new cost level for loins minus the relative cost or, in other words 3 times the relative cost minus the new cost level for hams and the new cost level for loins, i.e., COMBINED COST=REL COST−(NEW COST LEVEL HAM−REL COST)−(NEW COST LEVEL LOIN−REL COST); or REL COST×3−NEW COST LEVEL HAM−NEW COST LEVEL LOIN The next step is to examine the "combined costs" and select the "least cost" option.

This produces a set of cutting instructions for that carcass which are issued to the cutting department. Next the old cost levels are replaced with new cost levels, reflecting the changes resulting and the needs table is updated by removing the selected option from the needs table. This procedure is replicated until all the available carcasses in the table are individually used up.

In Appendix A, the Maximum Ham Available by Relative Cost table is set up horizontally in terms of weight ranges for the two trim grades, Commodity and Gwaltney respectively, for each of the five weight ranges: 14/down, 14/17, 17/20, 20/26, and 26/up. Thus there are ten columns. There are 40 rows in each column, each row representing a "unit" of relative cost, which is an arbitrary cost figure (which may or may not have a dollar value) but which represents the cost to convert the specific carcass to each one of the designated trims as compared to the maximum dollar value that could be obtained from making a computer selected optimum cut based on physical and subjective characteristics of each carcass in relation to given current provision market prices. The "relative cost" is a useful term as applied to the teachings of the method of this invention since it permits a determination and the selection of the "least cost option" and which allows the computer to issue the cutting instructions not only in terms of physical and subjective measurements or values versus current provision market prices but also in terms of demand or need.

Optionally, an additional step may be to set initial cost levels with respect to each of the possible trims in the weight ranges. In the 14 carcass illustration represented in the tables and files forming the Appendix A, there was an assumed need for one Gwaltney ham in the 14/down range, two Gwaltney hams in the 14/17 range, 5 Gwaltney hams in the 17/20 range, 6 Gwaltney hams in the 20/26 range from each side of the carcass. The initial cost levels are then determined by going down the column until a sufficient number of options are assumed to meet the current need, for example, in satisfying the need for one 14/down Gwaltney ham it is necessary to reach the 24th level, thus the relative cost to convert that carcass to produce the one Gwaltney ham needed is 24. Since there is no demand for either a 14/down Commodity ham or 14/17 Commodity ham those cost levels are initially set at −100. Similarly looking at the "Hams Available Versus Relative Cost" table in Appendix A, it will be seen that the cost level of five was reached before the demand for two hams in the Gwaltney 14/17 lb. cut were obtained. The same result arises in connection with the five Gwaltney hams needed in the 17/20 pound range. Since 6 Gwaltney hams are needed in the 20/26 range the cost level is initialized at 40.

Similarly the "Maximum Loins Available Versus the Relative Cost Level" table included in Appendix A shows the four weight ranges for loins in each of three trims, Commodity, Gwaltney and Bladeless and again by comparing the needs to the availability in each of the columns relative costs can be initialized. It is the various levels in both the hams available by relative cost and loins available by relative cost tables that are adjusted as described above as each hog is removed from the chill chamber, identified and subsequently cup up pursuant to the selection made of the least cost options for the cuts produced from that specific carcass.

For some situations, including certain market conditions and the like, it may be unnecessary to use each carcass' identification indicia and consider individual carcasses as elements of the whole lot, in terms of measured or observed data. That data may be compared to market conditions and "generalized" optimum cut data may be developed as part of the CALC. OPT. step. Then if it proves desirable to do so (or if any carcass identify is lost) the generalized cutting instructions can be used to produce more viable results in terms of profit and loss than could have otherwise been obtained.

It will be appreciated from the above that while the best option for each cut for each carcass defines the zero relative cost, the other possible options are represented in the table as a function of the relative cost to convert that carcass' cuts to a given trim quality and weight range, expressed in units arbitrarily selected in the above example of 0 to 39 levels which may have a value in dollars/unit, a variable factor depending on current provision market prices.

As each least cost option is selected, the relative cost in the described tables is adjusted. Also the relative cost of not using the other 11 options is determined. In other words the replacement costs are determined as a function of the level changes as each decision is made and as each carcass is subtracted from the available resources.

In the computer print out illustrations contained in the Appendix A, it will be appreciated that the KILL FILE data is with respect to each hog of the 14 hog sample. Included in the CUT FILE portion of Appendix A is the information which is built from the KILL FILE and PRICES utilized to perform the calculation of the 12 options represented in the CUT FILE.

It will be seen from the above that the preparation of distribution tables for the purpose of converting the available carcasses to meet demands at the least cost can only be performed by a computer, since there is no other method known which could take into account the wide variety of options available with respect to each carcass. In the practical example illustrated, there are two possible trims for the ham, i.e. Commodity or Gwaltney. Since there are 21 possible cut-off points to sever the ham from the loin for that carcass there are 42 possible instructions for the ham cut. This assumes that the cutting instructions are issued in 1/10 inch increments from 0.5 to 2.5 inches distant from the aitch bone. Since there are three possible trims for each of the loins (i.e., Commodity, Gwaltney and Bladeless), the instruction which defines the point of demarcation is again issued in 1/10 inch increments from 0.5 inch to 2.5 inches from the reference point for a total of 21 possible points of line demarcation there are 63 possible instructions for the loin cut. Thus, in practice, $42 \times 63$ is equal to 2,646 separate possible cutting instructions.

It will be seen from the above that the preparation of distribution tables for the purpose of converting the available carcasses to meet demands at the least cost can only be performed by a computer, since there is no other method known which could take into account the wide variety of options available with respect to each carcass.

It should be understood that one of the particular benefits to properly utilizing the method of this invention arises by properly classifying each individual carcass in a series of carcasses to be processed into finished cuts. Each individual carcass in a series of carcasses is classified or identified by predetermined physical variables measured both in the terms of objective and subjective identifying characteristics and the information is stored so that each identified carcass and its related measurements form a portion of the KILL FILE which is compiled as the animals are processed between the point of slaughter to the time the dressed carcasses are placed in the chilling chambers. At the same time market indicator and production information which is current is determined and similarly stored in the computer's memory. Given the time necessary to chill the carcass the computer can then perform a comparison of the measurements of each individual carcass with the information stored relating to market indicator and production and/or demand so as to produce a CUT FILE in which the options available with respect to each carcass are calculated. Then the information from the CUT FILE is utilized during the actual cutting up of the carcass into its resultant cuts in order that each individual carcass is properly classified with respect to the total of the series of carcasses and a comparison of the current price and production requirements can result in cutting that carcass at those points which produce the least relative cost and hence the maximum profitability with respect to each carcass. In the example which follows one of the carcasses is properly classified and the other deliberately is not properly classified in order to illustrate the available economies that can be achieved utilizing the method of this invention.

By utilizing the cost to convert principle from the data arrived at by preparing the most viable options, it is possible to reduce the overall calculations to the best 12 so that there are two available options for each cut and trim. This provides for a wide flexibility in the options in a realistic and predictable way. The following tables demonstrate data which illustrates the successful use of the method of this invention.

| | Market Price* | 6/11/77 Actual Yield Produced from Live w/Ranges | | | Hog Costs | Nat. Prov. 3/7/77 | Nat. Prov. 1/27/77 |
|---|---|---|---|---|---|---|---|
| 14.5 DN Hams Unq | $.77 GW | 190/DN# | 180/190# | Discounted | $1.00 cwt | $.85 | $.73 |
| | | | 160/180# | Discounted | $5.00 | | |
| | | | 0/160# | Discounted | 10.00 | | |
| 14.6/17.5 | $.72 | 191/233 | 190/200# | Discounted | $.50 | | |
| | | 200/233# | | No Discount | | $.80 | $.68 |
| 17.6/20 | $.72 | 233/270 | 233/240 | No Discount | | | |
| | | | 240/250 | | $.50 | | |
| | | | 250/260 | | $1.00 | | |
| | | | 260/270 | | $2.00 | $.77 | $.67 |
| 20.1/26 | $.71 | 271/350 | 270/300 | | $5.00 | | |
| | | | 300/350 | | $10.00 | $.74 | $.67 |
| 14.5/DN Loins | $.93 | 240/DN | 0/160 | | $10.00 | | |
| | | | 160/180 | | $5.00 | | |
| | | | 180/190 | | $1.00 | | |
| | | | 190/200 | | $.50 | | |
| | | | 200/240 | | No Discount | $.73 | $.84 |
| 14.6/17.5 Loins | $.92 | 241/285 | 240/250 | | $.50 | | |
| | | | 250/260 | | $1.00 | | |
| | | | 260/270 | | $2.00 | | |
| | | | 270/285 | | $5.00 | $.72 | $.84 |
| 17.6/20.5 Loins | $.81 | 286/333 | 286/300 | | $5.00 | | |
| | | | 300/333 | | $10.00 | $.70 | $.80 |
| 20.6/Up Loins | $.70 | 334/Up | 334/Up | | $10.00 | $.65 | $.65 |
| 8/10 Bellies Unq | $.51 | 200/DN | 200/DN | | $10.00 | | |
| | | | | | $5.00 | | |
| | | | | | $1.00 | | |
| | | | | | .50 | $.45 | $.46 |
| 10/12 Bellies | $.54 | 201/240 | | | $.00 | $.46 | $.47 |
| 12/14 Bellies | $.56 | 241/283 | 240/250 | | $.50 | | |
| | | | 250/260 | | $1.00 | | |
| | | | 260/270 | | $2.00 | | |
| | | | 270/283 | | $5.00 | $.47½ | $.55 |
| 14/16 Bellies | $.56 | 283/320 | 283/300 | | $5.00 | | |
| | | | 300/320 | | $10.00 | $.47½ | $.54 |
| 16/18 Bellies | $.55 | 320/360 | 320/360 | | $10.00 | $.46 | $.53 |
| Pix 4/8 8/10 | $.45 | 260/DN | Full Range | | All Prices | $.40 | $.42 |
| Butts 4/8 | $.80 | 300/DN | Full Range | | All Prices | $.56 | $.58½ |

Considering only Grade 2 for illustration:

WEEK ENDING 6/11/77 YIELD RESULTS (AVG)

| 15% Hams # | 12.30% Loins | $\frac{9.00\%}{90}$ = 10% Bellies Rind On | 6.4% Pix | 4.8% Butts |
|---|---|---|---|---|
| 0/160 12 DN# | 9.84 DN# | 8.0 DN# | 5.12/DN# | 3.8/DN# graded as 4/8 |
| 160/180 12/13.5 | 9.85/11.07# | 8.1/9.0 | 5.13/5.76 | 3.9/4.32 |
| 180/190 12.5/14.25 | 11.08/11.69 | 9.1/9.5 | 5.77/6.08 | 4.33/4.50 |
| 190/200 14.26/15 | 11.70/12.3 | 9.6/10 | 6.09/6.4 | 4.51/4.8 |
| 200/240 15.1/18 | 12.4/14.76 | 10.1/12.0 | 6.5/7.08 | 4.81/5.76 |
| 240/250 18.1/18.75 | 14.8/15.40 | 12.1/12.5 | 7.69/8.0 | 5.77/6.0 |
| 250/260 18.8/19.5 | 15.5/15.99 | 12.6/13.0 | 8.1/8.32 | 6.1/6.24 |
| 260/270 19.6/20.25 | 16/16.6 | 13.1/13.5 | 8.33/8.64 | 6.25/6.48 |
| 270/300 20.25/22.5 | 16.7/18.45 | 13.6/15.0 | 8.65/9.6 | 6.49/7.20 |

*NATIONAL PROVISION MARKET PRICE, June 20, 1977 - Adjusted for Gwaltney trim (Nat. Prov. Mkt. Price +8%)

maximization of the profit with respect to each carcass, given the existing market conditions for the wholesale cuts, the relative cost of selecting the available options and the variable demand on any given day.

By collecting and comparing the output data in terms of total shipments of hog cuts produced each day, it is possible to determine, with an accuracy previously not available, the overall profitability of any given day's profit or loss and to utilize that information to improve on the estimates, based on the hog purchase discount schedules, to arrive at much more realistic data as to the successful use of the method of this invention to maximize profits.

By calculating individual hog cut out results utilizing the method of this invention it is quite feasible to maximize the profit by taking into account the available The above illustrates that any given product can be produced from hogs within weight ranges at variable applicable discounts under existing practices. There has been herebefore no way to correlate the value of the products produced and the price paid for the animal from which those products came from until the methods taught by this invention.

However, utilizing charts such as the above, based on the assumptions as described above, it is possible and feasible to calculate the cut out result for each weight range relative to daily market performance. It is also possible to expand these cut out results from nine weight ranges to include four grades thus obtaining 36 hog cut out results daily. These would be based upon average assumptions of yields. A program can be written which would generate this information daily. An IBM "System 7" computer is adequate to handle processing the information and to generate the results. This would provide management with a tool to identify the 36 possibilities and guide management to the alternate opportunities to maximize the profit of the total operation.

The approach of this invention of cutting hogs on an individual basis will provide all the necessary data to predict the primal cuts on each hog at the conclusion of the hog kill and prior to cutting it. It will also be feasible to determine the cut out results of each hog and then to identify the profitable hogs from the unprofitable ones and identify what weights and grades are desirable under the daily fluctuating market conditions. This makes it possible to take into account the variation of the individual hogs rather than relying on the "average of averages" which is currently done to establish discount schedules and attempt to determine the validity of hog grade and yield report.

It will be noted from the block diagram in the figure that one of the inputs to the NEEDS table in from PRODUCTION or SCHEDULING. It will be appreciated that in addition to the sales data that certain production scheduling is required in order to meet existing current, or longer range, demands. Therefore, an input from the production department may be utilized so that in the determination of the needs which must be met both current sales and future demand will be taken into account.

It will also be appreciated that generally two basic types of products result from the cut-out of each carcass. There are fresh pork products which are sold as such. Also, there is, or may be, a need in any given point for a certain portion of the cut-out to be utilized for further plant processing such as the operations necessary to produce bacon and hams of various types. It will also be noted that by collecting the data on the cuts produced, whether they are sold as fresh or processed, that it is possible to utilize that data to calculate the profit and loss on each hog or lot of hogs, which information can then be utilized to prepare a much more realistic hog grade and yield report.

It will be noted that there is a dotted line running between the NEEDS block and the calculation of the options (CALC. OPT.) block as well as dotted lines running from the COST FILE to the SALES block and the PROFIT AND LOSS CALCULATION block. These dotted lines are included for purposes of illustrating possible arrangements for the utilization of the data produced when utilizing the method of this invention.

As a further illustration of the capability of the method of this invention it will be appreciated if there are three bone-in trims for ham and six boneless ham trims that are a total of 9 possible ham options for each carcass or a total of a possible 189 cutting instructions for the ham trim alone. Similarly, if there are seven trims for the loins, such as extra lean bone-in, extra lean boneless, Commodity, Commodity boneless, Gwaltney, Gwaltney boneless, times the 21 possible locations for the loin/shoulder cut, that there are a total of 147 cutting instructions for the loin/shoulder cut. Also, if there are five shoulder trims, for example, including Boston butts, bone-in Boston butts, bone-in and boneless picnics and a separate grade for boneless shoulders again with 21 possible locations for the cutting instructions, it can be seen that, taking the total of nine ham trims, seven loin trims and five shoulder trims, multiplied by the 21 possible cutting positions for each, that there results in a possibility of 2,917,215 separate cutting instructions with respect to each carcass. If one were to take into account the five weight ranges of bellies and in each instance consider rind-on or rind-off it would add even more possible instructions which would have to be issued. It will also be appreciated that each packer will select those trim options that are individual to his decision as to what products to produce and what trims. It is immediately apparent that a computer is required in order to solve for and issue instructions specific to each carcass. Of course, the matter is complicated by the requirement of the method of this invention as each individual carcass is removed from resources the relative costs levels, demands or needs are altered and that the system must constantly update itself so as to take into account what is required versus that which is available to meet the demand. The practical example given above, with just two ham trims and three loin trims, (illustrated in Appendix A), is one practical way of implementing the method of this invention.

The following are illustrative examples of algorithms useful in accordance with the method of this invention for calculating the instructions for the cut off commands to the butchers.

COMMODITY HAM $X_{CH}$ (weight of Comm Ham) $= K_o + L_1X_1 + L_2X_2 + L_3X_3$

| | |
|---|---|
| Constant | −15.9684 ($K_o$) |
| Hot Carcass WGT $= X_1$ | +0.0539 $L_1$ coefficient |
| HAM CIR $= X_2$ | +0.8794 $L_2$ coefficient |
| ACH * CIRC * CIRC $= X_3$ | +0.0021 $L_3$ coefficient |

ACH is the cut distance from aitch bone.

GWALTNEY HAM $X_{GH}$ (Gwal Ham) $= K_o + L_1X_1 + L_2X_2 + L_3X_3 + L_4X_4 + L_5X_5$

| | |
|---|---|
| Constant | −2.4108 $K_o$ |
| WGT $X_1$ | +0.0555 $L_1$ |
| WGT/(CIRC/LLUM) $X_2$ | −0.2648 $L_2$ |
| $(CIR)^2$ $X_3$ | +0.0160 $L_3$ |
| ACH * WGT $X_4$ | +0.0073 $L_4$ |
| ACH * LLUM $X_5$ | +0.0839 $L_5$ |

LLUM is a fat depth measurement at the last lumbar.

COMMODITY LOIN $X_{CL}$ (Comm Loin) $= K_o + L_1X_1 + L_2X_2 + L_3X_3 + L_4X_4 + L_5X_5$

| | |
|---|---|
| Constant | −17.0459 $K_o$ |
| CARCASS LENG $X_1$ | +0.9821 $L_1$ |
| ACH $X_2$ | −0.8933 $L_2$ |
| (1st thor vert. + 1.1) * LENG $X_3$ | −0.0373 $L_3$ |
| LOIN WIDTH * LUM $X_4$ | −0.2124 $L_4$ |
| LOIN WIDTH * * (WGT/LENG) $X_5$ | +0.3552 $L_5$ |

The first thor vert. indicates the fat depth measurement at the first thoracic vertebrae and the LOIN WIDTH is a constant standard width used in practice. However, since they may change the factor is included as a factor rather than as a constant to allow for such adaptation of the algorithm from plant to plant.

GWALTNEY LOIN $X_{GL}$ (Gwalt Loin) $= K_o + L_1X_1 + L_2X_2 + L_3X_3 + L_4X_4 + L_5X_5 + L_6X_6$

| | |
|---|---|
| Constant | −14.4564 $K_o$ |
| WGT $X_1$ | +0.0392 $L_1$ |
| CIRC $X_2$ | +0.4356 $L_2$ |
| LENG $X_3$ | +0.4212 $L_3$ |
| ACH * CIRC $X_4$ | −0.0371 $L_4$ |
| (1st thor vert 1.1) * LLUM $X_5$ | +0.1287 $L_5$ |

-continued

| | |
|---|---|
| LOIN WIDTH (WGT/LENG) $X_6$ | +0.1287 $L_6$ |
| ROUGH HAM | |
| $X_{RH}$ (Rough Ham) = $K_o + L_1X_1 + L_2X_2 + L_3X_3 + L_4X_4$ | |
| Constant | −3.0291 $K_o$ |
| WGT $X_1$ | +0.0432 $L_1$ |
| FIRST RIB $X_2$ | −0.8261 $L_2$ |
| $(CIR)^2$ $X_3$ | +0.0233 $L_3$ |
| ACH * WGT $X_4$ | +0.0081 $L_4$ |
| ROUGH LOIN | |
| $X_{RL}$ (Rough Loin) = $K_o + L_1X_1 + L_2X_2 + L_3X_3 + L_4X_4 + L_5X_5 + L_6X_6$ | |
| Constant | −6.0585 $K_o$ |
| WGT $X_1$ | +0.1190 $L_1$ |
| LENG $X_2$ | +0.3989 $L_2$ |
| LAST RIB $X_3$ | −1.7293 $L_3$ |
| ACH * CIR $X_4$ | −0.0467 $L_4$ |
| (1st thor vert + 1.1) * CIR $X_5$ | −0.0604 $L_5$ |
| LOIN WIDTH * LRIB $X_6$ | +0.9037 $L_6$ |
| Backfat | |
| ROUGH SHOULDER | |
| $K_{RS}$ (Rough Shl) = $K_o + L_1X_1 + L_2X_2 + L_3L_3$ | |
| Constant | +1.6386 |
| WGT $X_1$ | +0.0814 |
| LLUM $X_2$ | −1.0531 |
| (1st Thor vert + 1.1) * WGT $X_3$ | +0.0153 |

It will be appreciated that the coefficients utilized may vary from plant to plant and those given above are illustrative of those found to be useful in actual practice in accordance with the teachings of this invention.

It will also be appreciated that the entire method as taught by this invention need not be employed in order to result in substantial increased profitability. One initial implementation of the method of this invention would involve producing six solutions which would be "Commodity" trim and "Gwaltney" trim and ham/loins and a decision as to whether the loin should be blade-in or bladeless. This would produce a possibility of six sets of trim instructions for cutting individual carcasses.

The next step of implementing the method of this invention would be adding additional "Rough" trim for each of the ham, loin and shoulder cuts which would make a total of nine sets of instructions which could be produced from the computer solution for each carcass issued in the form of cutting instructions.

Another step would be to implement, utilizing the data and information already available, trim instructions with respect to the hams to make them bone-in or boneless. This would add an additional three sets of possible instructions. Following that would be to implement the break-up of the shoulder into boneless picnic hams, bone-in picnic hams, boneless Boston butts, bone-in Boston butts for each one of the three grades, for a total of 27 possible instructions with respect to each carcass or with respect to each other.

The extent to which the method of this invention is implemented will depend entirely on how much variety each processing plant desires to have in the products produced in accordance with the teachings of this invention. It will also be appreciated that it is possible to make a determination with respect to the boneless hams as to those which will be sold as boiled hams and boneless hams which will be sold as water added. This additional category with respect to the three trims adds an additional six sets of instructions.

Thus, it will be seen that the individual carcasses can be cut into the various products to meet the market conditions both in terms of price and demand in such a manner as to maximize the profitability with respect to each carcass and thus maximize the profits of the overall operation.

As illustrations of the manner in which the instructions resulting from the computer solution of the algorithm can be issued to the cutting floor, the following are typical examples. Thus, the first cut normally made is the ham/loin cut off demarcation point. This is normally done in terms of a computer solution which determines the distance from the aitch bone at which the cut should be made. In accordance with the teachings of application Ser. No. 714,875 the solution can be used to position a light line at a point, which when used as a reference point, will automatically move the ham saw the required distance from the light line reference point. This permits the light line to be placed on the aitch bone and the ham/loin cut will be made automatically as instructed by the computer to be the optimum point. Similarly the loin cut-off light or shadow is positioned by a fixed distance, calculated by the computer as the least cost to convert decision, at a point in reference from the juncture of the first thoracic vertebrae and the first rib. With respect to the matter of further processing the hams, the decisions as to whether the individual ham is to be sold bone-in or boneless, or the two types of boiled or water added hams in the various trims, a system of color dots can be placed on the shank end of the ham to indicate to the butcher whether that individual ham is to be processed as bone-in or boneless. Similarly, color coded ink dots or color symbols can be sprayed on to the shoulder to indicate the manner in which the shoulder is to be optimized in either a picnic of the bone-in or boneless type or Boston butt of the bone-in or boneless type for each of the trims desired.

It will be seen from the above that the opportunity is provided for a processing plant to optimize its profits and to minimize its loss with respect to each individual carcass and to provide data to measure actual performance between that which is predicted, based on the purchased weights, the losses during processing and the ultimate products produced which are sold. This provides a tremendous potential for increased profits in the industry which is traditionally operated at approximately a 1% profit margin.

It will be appreciated that the specific examples given of the data collected, processed and utilized in the method of this invention can be varied depending upon the desired results at each individual processing plant. The precise implementation and the extent to which all of the data is collected and utilized as well as the instructions for the cut up of the various parts of the hog will also be individualized by each process plant.

The following is an example to illustrate the specifics of one implementation of the method of this invention and as an illustration of the results which can be obtained utilizing the teachings of this invention.

PRODUCT CLASSIFYING EXAMPLE

To illustrate the economic impact of properly processing the type of hog to meet the sales or market indicators and production information, the following test was performed. Two carcasses were selected of the same weight, one was properly classified with respect to market value of cuts compared to the actual carcasses available. The other was not properly classified.

At 540 hogs hourly, utilizing electronic data input tools, the fat on each carcass at three separate locations was measured, the body length, the ham circumference, the carcass weight, and the muscle score, which is a subjective evaluation (a score of 1 is excellent indicating well developed muscle, and a score of 4 is of poor quality reflecting underdevelopment) data was collected for each of the hogs.

The identity of each hog and the above statistical physical data is interfaced into an IBM "System 7" computer which has been programmed to solve algorithms as disclosed above to evaluate the options available and arrive at maximum market value solutions to position the sales and production needs relative to each carcass. Market indicator and production requirement information are entered into the program in a memory after all hogs have been slaughtered and all physical data has been collected and stored in the memory.

The solutions for all hogs are arrived at relative to sales and production requirements after production ceases. The following morning as the hogs, which have been chilled over night, enter the cutting department the identification number of each hog is entered into the computer which determines the commands to be issued to the butchers, including the exact cut off point for each cut as well as the trimmed type of product; such as, bone-in "Commodity" ham, boneless extra lean ham, etc.

The directional devices or output tools transmit the exact cut off measurements to the carcass in the form of light lines or shadow lines. The signal to inform butchers regarding bone-in versus boneless hams, blade-on versus bladeless loins, and all such instructions is a color-code, which was displayed using colored lights but may be color coded dots sprayed on selected locations of the carcass. Such a spray could be activated by the computer and create a dot, smaller than a quarter, of an edible vegetable coloring, i.e. Carotine, etc. Various colors will designate the type of trim.

The results of the tests are illustrated in Tables I and II.

TABLE 1

| | INPUT DATA | |
|---|---|---|
| | CARCASS NO. 1 Properly Classified | CARCASS NO. 2 Not Properly Classified |
| Dressed Weight | 167.3 lbs. | 167.1 lbs. |
| Ham Circumference | 26.6 inches | 25.1 inches |
| Body Length | 32.7 inches | 29.9 inches |
| Fat at Last Lumbar | 0.9 inches | 1.8 inches |
| Fat at Last Rib | 0.8 inches | 2.0 inches |
| Fat at First Rib | 1.8 inches | 3.1 inches |
| Muscle Score | 2 | 4 |

TABLE II

| | CARCASS NO. 1 PROPERLY CLASSIFIED HAM WEIGHTS | | CARCASS NO. 2 NOT PROPERLY POSITIONED HAM WEIGHTS | |
|---|---|---|---|---|
| | LEFT | RIGHT | LEFT | RIGHT |
| Cutting Distance From Aitch Bone | 0.6 inches | 2.5 inches | 0.6 inches | 2.5 inches |
| Untrimmed Weight | 20.2 lbs. | 22.8 lbs. | 16.3 lbs. | 19.9 lbs. |
| Without Feet & Hock | 18.7 lbs. | 21.6 lbs. | 15.0 lbs. | 18.5 lbs. |
| Commodity Trim | 18.3 lbs. | 20.6 lbs. | 14.8 lbs. | 18.0 lbs. |
| Gwaltney Trim | 18.2 lbs. | 20.6 lbs. | 13.1 lbs. | 16.1 lbs. |
| Bone | 1.8 lbs. | 2.0 lbs. | 1.5 lbs. | 1.7 lbs. |
| Skin & Fat | 3.2 lbs. | 3.8 lbs. | 5.0 lbs. | 6.8 lbs. |

TABLE II-continued

| | CARCASS NO. 1 PROPERLY CLASSIFIED HAM WEIGHTS | | CARCASS NO. 2 NOT PROPERLY POSITIONED HAM WEIGHTS | |
|---|---|---|---|---|
| | LEFT | RIGHT | LEFT | RIGHT |
| Extra Lean Boneless Buffet | 13.3 lbs. | 14.8 lbs. | 8.3 lbs. | 9.5 lbs. |

For a properly classified carcass designated Carcass No. 1 the physical dimensions thereof and the muscle score are shown in TABLE I under the heading CARCASS NO. 1. The ham was removed from the left side of Carcass No. 1 at 0.6" beyond the aitch bone. The right ham was removed at 2.5" beyond the aitch bone. This was done to illustrate this option when matching dressed carcasses to various types of hams and cut off points.

This hog was cut and hams were trimmed, defatted and boned to extra lean buffet hams with the result being shown in the first two columns of TABLE II.

The market prices for bone-in commodity hams used are:

14.6 lbs. to 17.5 lbs.—$0.765 per lb.

17.6 lbs. to 20.5 lbs.—$0.765 per lb.

Cost to convert short left ham—18.3 lbs.×$0.765=

| | | | |
|---|---|---|---|
| $14.00 | - Cost of Commodity Ham | | |
| −.484 | By Product Credit | By Product | |
| $13.52 | = $1.02/lb. | 1.8 lbs. Bone at | |
| 13.3 | lbs. | $.02 per lb. | = .036 |
| | Cost of Extra Lean | 3.2 lbs. Skin & Fat | = .448 |
| | Boneless Buffet Ham | at $.14 per lb. | .484 |

Cost to convert long right ham—20.6 lbs.×$0.765=

| | | | |
|---|---|---|---|
| $15.76 | | | |
| −.57 | By Product Credit | By Product | |
| $15.19 | = $1.026/lb. | 2.0 lbs. Bone at | |
| 14.8 | lbs. | $.02 per lb. | = .040 |
| | Cost of Extra Lean | 3.8 lbs. Skin & Fat | = .530 |
| | Boneless Buffet Ham | at $.14 per lb. | .57 |

Using the same technique, Carcass No. 2 was selected though it was undesirable for the production of extra lean, top quality buffet hams. The program would reject this carcass for boning hams. We use this carcass only for illustration of the economic advantage of the system employed. The physical data on Carcass No. 2 is shown in the second column of TABLE I.

| | |
|---|---|
| Carcass No. 1 Cost Boneless Right Long Ham | $1.026/lb. |
| Market Value Bone-in Commodity Ham | −.765/lb. |
| Computer selected, Cost to Convert | $.261/lb. |
| Carcass No. 2 Cost Boneless Right Long Ham | $1.350/lb. |
| Market Value Bone-in Commodity Ham | −.765/lb. |
| Cost to Convert | $.585/lb. |

| | |
|---|---|
| .585 | Cost to Convert Long Right Ham from undesirable hog |
| −.261 | Cost to Convert long right ham from computer selected hog |
| .324 | Added Cost using undesirable hog |

This is a typical example and demonstrates that the cost to convert will double when going from a desirable properly classified hog as opposed to using an undesirable hog for this conversion.

Due to rapidly changing ham markets, most packers also compare yield percentages. Such a comparison follows:

| | | |
|---|---|---|
| From left short ham, computer selection | | |
| Boneless Extra Lean Buffet | 13.3 lbs. | = 72.7% Yield |
| Bone-in Commodity Trim Ham | 18.3 lbs. | |
| From right long ham, computer selection | | |
| Boneless Extra Lean Buffet | 14.8 lbs. | = 71.8% Yield |
| Bone-in Commodity Trim Ham | 20.6 lbs. | |
| From Undesirable short left side ham | | |
| Boneless Extra Lean Buffet | 8.3 lbs. | = 56.1% Yield |
| Bone-in Commodity Trim Ham | 14.8 lbs. | |
| From Undesirable long right side ham | | |
| Boneless Extra Lean Buffet | 9.5 lbs. | = 52.8% Yield |
| Bone-in Commodity Trim Ham | 18.0 lbs. | |

The following yields reflect the percentage of boneless extra lean buffet style ham obtained from the properly positioned hog as opposed to the undesirable.

| | | |
|---|---|---|
| 13.3 lbs. / 167.3 ÷ | Boneless Extra Lean Ham / 2 Sides Computer selected Hog | = 15.90% Short Ham |
| 14.8 lbs. / 167.3 ÷ | Boneless Extra Lean Ham / 2 Sides Computer selected Hog | = 17.69% Long Ham |
| 8.3 lbs. / 167.1 ÷ | Boneless Extra Lean Ham / 2 Sides Undesirable Hog | = 9.93% Short Ham |
| 9.5 lbs. / 167.1 ÷ | Boneless Extra Lean Ham / 2 Sides Undesirable Hog | = 11.37% Long Ham |

The above is but one illustration of the economies that may be obtained utilizing the method of this invention.

As indicated above the matter of identification of each carcass is an important matter. One of the approaches suggested above was to use an automatically readable bar code placket mounted on magnetic tape which was placed on the metal gambrel of each hog trolley. In use a problem was encountered in that oil used to lubricate the trolly drained over the bar code requiring frequent cleaning and many errors.

Another satisfactory way of accomplishing substantially the same result is to use a sequentially numbered white gummed tape with the numbers printed on 6" centers. An automatic tape dispenser ejects 6" of the tape with the hog identification number in sequential order. An operator reads a digital display, which is programmed by the computer to add one digit to each preceding number each time a hog trolley triggers a micro switch thus creating a sequential unique identification number for that carcass which is entering the number station at the pre-evisceration scale location.

An operator verifies that the number on the tape corresponds with the number displayed on the digital display thus assuring that the computer has entered the same number as used to identify the hog and that the correct pre-evisceration weight will be entered into the computer for that thus identified carcass. The operator may also at this point manually enter the purchase lot tattoo number of that hog into the computer's memory. At this particular location the hogs cannot get out of sequence since it is the beginning of the hog dressing operation.

Following the pre-evisceration scale location and the entry of the indicia referred to, the carcasses are shaved, the heads dropped, the viscera removed and the federal meat inspection takes place. At this point in time a small percentage, in the order of 1 to 2% of the carcasses will be switched out of the conveyor system onto a final inspection rail. These are hogs which are suspects. Some of them may be condemned and will not re-enter the dressing conveyor, but instead will be rendered for inedible by-products. Most of the carcasses, however, will have bruises which are trimmed from the carcass or an arthritic shoulder or ham will be removed and the carcass will be returned, out of sequence, to the primary dressing conveyor prior to the evaluation station where operators will input muscle score, ham circumference, body length, three fat back measurements and hot dressed scale weight, entry of all of which are input to the computer at that station.

The computer is programmed to add one digit to the preceding number as each carcass enters the later zone. If the operator enters a re-entry number, which is out of sequence it will override the automatic computer input but the computer will add the digit one to the re-entry hog number for the next hog to enter the zone which triggers a micro switch. Accordingly, the operator will compare the digital display, which indicates the number the computer will enter, with the identification number on the gambrel. If the result of that comparison is that the two are identical the operator makes no change. If, however, the numbers do not correspond, the operator will input the number on the gum tape attached to the gambrel which will take precedence over the computer display.

Since only a few hogs daily are out of sequence as a result of the meat inspection process, there is less likelihood of errors which may be produced than by having the operator key-boarding an identification number for each hog that is slaughtered.

As pointed out above the information is stored in the computer's memory and optimum cutting lines of demarcation will be established during the night period while the carcasses are being chilled. On another day the carcasses will be conveyed to the Cutting Department in substantially sequential order. However, an operator in the Cutting Department will enter the identification number from the tape on the gambrel in order to request cutting and processing instructions. This operator will have a digital display and can by comparison verify that the identification number on the tape attached to the gambrel agrees with the digital display. If it does not the operator enters the number from the tape label on the gambrel. On the other hand if the number on the digital display matches the number on the gambrel the operator need do nothing. It is estimated that the operator in the Cutting Department will enter approximately 30% of the identification numbers and that the remaining 70% will be entered sequentially by virtue of the computer's digital display.

Once the carcass is dropped onto the cutting conveyor, the empty trolley and gambrel are returned by the conveyor to the Killing Department. At this point in time the gambrel can be tilted or otherwise moved into a position where a blower or other device can remove the paper tape. It is estimated that the cost of one time paper tape is considerably less than the labor involved in removing a bar code on a magnetic tape and the cleaning costs of such.

The illustrations contained herein apply principally to the United States market under presently existing procedures. Those skilled in this art in other countries having differing standards and practices will, nevertheless, find the techniques valuable.

Accordingly the subject matter of this invention should not be confined to the specifics given above by way of illustration of practical implementation of the method of this invention but is limited only by the scope of the appended claims.

TRAD. HOGS KILL DATE 9/19/77

CUTFILE KILL FILE PNTR = 3789 HF045

| | | | | | | | | | | | | |
|---|---|---|---|---|---|---|---|---|---|---|---|---|
| HOG | 9760 | 1 | 826 | 0 | 0 | 1892 | 0 | 272 | 339 | 11 | | |
| | 10 | 19 | 2 | 0000 | 0 | 0 | 1 | 0 | 0 | 12 | | |
| TRIM CODE | 2342 | 2143 | 2243 | 2233 | 2333 | 1342 | 2134 | 1143 | 1243 | 1233 | 1333 | 1134 |
| CUT CODE | 1905 | 1905 | 1905 | 0505 | 0505 | 1905 | 0505 | 1905 | 1905 | 0505 | 0505 | 0505 |
| REL COST | 6 | 12 | 16 | 20 | 21 | 24 | 28 | 36 | 40 | 43 | 44 | 51 |
| SENTRY(I,1) | 33 | 33 | 33 | 33 | 33 | 33 | 33 | 33 | 33 | 33 | 33 | 33 |
| SENTRY(I,2) | 50 | 50 | 25 | 25 | 50 | 50 | 50 | 50 | 25 | 25 | 50 | 50 |
| BASE WTS | 1825 | 1814 | 2081 | 2108 | 2237 | 3032 | 1906 | 7399 | 0 | 0 | 0 | 0 |
| COEF | 1.4734 | 1.5537 | 1.5325 | -1.0091 | -0.8933 | -1.2702 | -0.9899 | -1.2645 | -1.6429 | 2.8948 | 0.0000 | 0.0000 |

| | | | | | | | | | | | | |
|---|---|---|---|---|---|---|---|---|---|---|---|---|
| HOG | 6249 | 2 | 826 | 0 | 0 | 1560 | 0 | 252 | 309 | 10 | | |
| | 7 | 18 | 2 | 0000 | 0 | 0 | 1 | 0 | 0 | 12 | | |
| TRIM CODE | 2132 | 2231 | 2331 | 2222 | 2322 | 2123 | 1132 | 1231 | 1331 | 1222 | 1322 | 1123 |
| CUT CODE | 1905 | 1905 | 1905 | 0505 | 0505 | 0505 | 1905 | 1905 | 1905 | 0505 | 0505 | 0505 |
| REL COST | 0 | 3 | 5 | 6 | 8 | 19 | 20 | 23 | 25 | 26 | 28 | 39 |
| SENTRY(I,1) | 33 | 33 | 33 | 33 | 33 | 33 | 33 | 33 | 33 | 33 | 33 | 33 |
| SENTRY(I,2) | 50 | 50 | 50 | 50 | 50 | 50 | 50 | 50 | 50 | 50 | 50 | 50 |
| BASE WTS | 1476 | 1460 | 1701 | 1745 | 1883 | 2466 | 1590 | 5997 | 0 | 0 | 0 | 0 |
| COEF | 1.2227 | 1.3336 | 1.2636 | -0.9349 | -0.8933 | -1.1768 | -0.8999 | -1.1526 | -1.5221 | 2.3868 | 0.0000 | 0.0000 |

| | | | | | | | | | | | | |
|---|---|---|---|---|---|---|---|---|---|---|---|---|
| HOG | 9478 | 3 | 826 | 0 | 0 | 1574 | 0 | 263 | 324 | 10 | | |
| | 9 | 11 | 1 | 0000 | 0 | 0 | 1 | 0 | 0 | 12 | | |
| TRIM CODE | 2132 | 2331 | 2232 | 2322 | 1132 | 2123 | 2223 | 1331 | 1232 | 1322 | 1123 | 1223 |
| CUT CODE | 1905 | 1905 | 1905 | 0505 | 1905 | 0505 | 0505 | 1905 | 1905 | 0505 | 0505 | 0505 |
| REL COST | 0 | 6 | 7 | 8 | 18 | 20 | 23 | 24 | 25 | 28 | 41 | 44 |
| SENTRY(I,1) | 33 | 33 | 33 | 33 | 33 | 33 | 33 | 33 | 33 | 33 | 33 | 33 |
| SENTRY(I,2) | 50 | 50 | 50 | 50 | 50 | 50 | 50 | 50 | 50 | 50 | 50 | 50 |
| BASE WTS | 1580 | 1564 | 1897 | 1851 | 1995 | 2578 | 1604 | 6298 | 0 | 0 | 0 | 0 |
| COEF | 1.2329 | 1.4525 | 1.2749 | -0.9757 | -0.8933 | -1.2282 | -0.8999 | -1.2085 | -1.5885 | 2.4082 | 0.0000 | 0.0000 |

| | | | | | | | | | | | | |
|---|---|---|---|---|---|---|---|---|---|---|---|---|
| HOG | 4730 | 4 | 826 | 0 | 0 | 1601 | 0 | 249 | 307 | 10 | | |
| | 12 | 22 | 2 | 0000 | 0 | 0 | 1 | 0 | 0 | 12 | | |
| TRIM CODE | 2122 | 2132 | 2231 | 2222 | 2331 | 2322 | 2123 | 1132 | 1231 | 1222 | 1331 | 1322 |
| CUT CODE | 0C05 | 1905 | 1905 | 0C05 | 1905 | 0C05 | 0505 | 1905 | 1905 | 0605 | 1905 | 0605 |
| REL COST | 0 | 0 | 3 | 5 | 5 | 7 | 20 | 21 | 24 | 26 | 27 | 29 |
| SENTRY(I,1) | 25 | 33 | 33 | 25 | 33 | 25 | 25 | 33 | 33 | 50 | 33 | 50 |
| SENTRY(I,2) | 33 | 33 | 50 | 50 | 50 | 50 | 100 | 33 | 50 | 50 | 50 | 50 |
| BASE WTS | 1469 | 1455 | 1651 | 1749 | 1889 | 2617 | 1631 | 6170 | 0 | 0 | 0 | 0 |
| COEF | 1.2526 | 1.3020 | 1.2968 | -0.9238 | -0.8933 | -1.1628 | -0.8999 | -1.1451 | -1.5040 | 2.4495 | 0.0000 | 0.0000 |

| | | | | | | | | | | | | |
|---|---|---|---|---|---|---|---|---|---|---|---|---|
| HOG | 7428 | 5 | 826 | 0 | 0 | 1180 | 0 | 235 | 310 | 11 | | |
| | 34 | 19 | 3 | 0000 | 0 | 0 | 1 | 0 | 0 | 8 | | |
| TRIM CODE | 2111 | 2112 | 1111 | 2211 | 2311 | 1112 | 1211 | 1311 | 0000 | 0000 | 0000 | 0000 |
| CUT CODE | 1905 | 0505 | 1905 | 1905 | 1905 | 0505 | 1905 | 1905 | 0000 | 0000 | 0000 | 0000 |
| REL COST | 0 | 6 | 21 | 22 | 24 | 29 | 43 | 45 | 0 | 0 | 0 | 0 |
| SENTRY(I,1) | 25 | 25 | 25 | 25 | 25 | 25 | 25 | 25 | 0 | 0 | 0 | 0 |
| SENTRY(I,2) | 50 | 50 | 50 | 50 | 50 | 50 | 50 | 50 | 0 | 0 | 0 | 0 |
| BASE WTS | 1176 | 1105 | 1336 | 1448 | 1693 | 2412 | 1207 | 5216 | 0 | 0 | 0 | 0 |
| COEF | 0.9537 | 1.1597 | 0.9558 | -0.8719 | -0.8933 | -1.0974 | -0.9899 | -1.1563 | -1.4194 | 1.8054 | 0.0000 | 0.0000 |

| | | | | | | | | | | | | |
|---|---|---|---|---|---|---|---|---|---|---|---|---|
| HOG | 2439 | 6 | 826 | 0 | 0 | 1769 | 0 | 270 | 329 | 11 | | |
| | 9 | 21 | 2 | 0000 | 0 | 0 | 1 | 0 | 0 | 12 | | |
| TRIM CODE | 2242 | 2342 | 2143 | 2233 | 2133 | 2333 | 1242 | 1342 | 1143 | 1233 | 1133 | 1333 |
| CUT CODE | 1905 | 1905 | 1905 | 0505 | 0505 | 0505 | 1905 | 1905 | 1905 | 0505 | 0505 | 0505 |
| REL COST | 6 | 2 | 14 | 19 | 20 | 21 | 22 | 24 | 36 | 42 | 43 | 43 |
| SENTRY(I,1) | 33 | 33 | 33 | 33 | 33 | 33 | 33 | 33 | 33 | 33 | 33 | 33 |
| SENTRY(I,2) | 50 | 50 | 25 | 50 | 25 | 50 | 50 | 50 | 25 | 50 | 25 | 50 |
| BASE WTS | 1749 | 1731 | 1986 | 1998 | 2112 | 2826 | 1785 | 6910 | 0 | 0 | 0 | 0 |
| COEF | 1.3837 | 1.5309 | 1.4329 | -1.0017 | -0.8933 | -1.2609 | -0.9899 | -1.2272 | -1.6308 | 2.7066 | 0 | 0 |

| | | | | | | | | | | | | |
|---|---|---|---|---|---|---|---|---|---|---|---|---|
| HOG | 6754 | 7 | 826 | 0 | 0 | 1579 | 0 | 250 | 316 | 9 | | |
| | 9 | 16 | 2 | 0000 | 0 | 0 | 1 | 0 | 0 | 12 | | |
| TRIM CODE | 2132 | 2222 | 2331 | 2232 | 2322 | 1122 | 1132 | 2123 | 1222 | 1322 | 1331 | 1232 |
| CUT CODE | 1905 | 0805 | 1905 | 1905 | 0805 | 1105 | 1905 | 0805 | 1105 | 1105 | 1905 | 1905 |
| REL COST | 0 | 8 | 8 | 9 | 11 | 15 | 18 | 19 | 24 | 26 | 26 | 27 |
| SENTRY(I,1) | 33 | 33 | 33 | 33 | 33 | 33 | 33 | 33 | 33 | 33 | 33 | 33 |
| SENTRY(I,2) | 33 | 25 | 50 | 25 | 50 | 33 | 33 | 100 | 25 | 50 | 50 | 25 |
| BASE WTS | 1449 | 1452 | 1703 | 1780 | 1950 | 2561 | 1620 | 6139 | 0 | 0 | 0 | 0 |
| COEF | 1.2282 | 1.3125 | 1.2790 | -0.9275 | -0.8933 | -1.1675 | -0.8099 | -1.1787 | -1.5100 | 2.4159 | 0 | 0 |

| | | | | | | | | | | | | |
|---|---|---|---|---|---|---|---|---|---|---|---|---|
| HOG | 9066 | 8 | 826 | 0 | 0 | 1419 | 0 | 256 | 306 | 8 | | |
| | 8 | 15 | 2 | 0000 | 0 | 0 | 1 | 0 | 0 | 12 | | |
| TRIM CODE | 2122 | 2221 | 2321 | 2222 | 2322 | 1122 | 1132 | 1321 | 1222 | 1231 | 1331 | 1322 |
| CUT CODE | 1905 | 1905 | 1905 | 0505 | 0505 | 0F05 | 1905 | 0F05 | 0F05 | 1905 | 1905 | 0505 |
| REL COST | 0 | 0 | 3 | 5 | 7 | 15 | 16 | 16 | 17 | 17 | 19 | 22 |
| SENTRY(I,1) | 20 | 20 | 20 | 20 | 20 | 25 | 33 | 25 | 25 | 33 | 33 | 25 |
| SENTRY(I,2) | 33 | 50 | 33 | 50 | 50 | 33 | 33 | 33 | 50 | 50 | 33 | 50 |
| BASE WTS | 1411 | 1419 | 1713 | 1692 | 1810 | 2305 | 1473 | 5437 | 0 | 0 | 0 | 0 |
| COEF | 1.1030 | 1.3763 | 1.1494 | -0.9498 | -0.8933 | -1.1955 | -0.7199 | -1.1414 | -1.5462 | 2.1711 | 0.0000 | 0.0000 |

| | | | | | | | | | | | | |
|---|---|---|---|---|---|---|---|---|---|---|---|---|
| HOG | 7506 | 9 | 826 | 0 | 0 | 1697 | 0 | 262 | 329 | 13 | | |
| | 10 | 22 | 2 | 0000 | 0 | 0 | 1 | 0 | 0 | 12 | | |
| TRIM CODE | 2242 | 2342 | 2332 | 2143 | 2133 | 2233 | 1232 | 1332 | 1322 | 1133 | 1123 | 1223 |
| CUT CODE | 1905 | 1905 | 0505 | 1905 | 0505 | 0505 | 1905 | 1905 | 0505 | 1905 | 0505 | 0505 |
| REL COST | 0 | 2 | 3 | 7 | 12 | 18 | 20 | 22 | 23 | 26 | 32 | 38 |
| SENTRY(I,1) | 33 | 33 | 33 | 33 | 33 | 33 | 33 | 33 | 33 | 33 | 33 | 33 |
| SENTRY(I,2) | 50 | 25 | 25 | 25 | 25 | 50 | 50 | 25 | 25 | 25 | 25 | 50 |
| BASE WTS | 1667 | 1621 | 1847 | 1903 | 2040 | 2767 | 1693 | 6600 | 0 | 0 | 0 | 0 |
| COEF | 1.3479 | 1.4415 | 1.3746 | -0.9720 | -0.8933 | -1.2235 | -1.1699 | -1.2272 | -1.5825 | 2.5964 | 0.0000 | 0.0000 |

| | | | | | | | | | | | | |
|---|---|---|---|---|---|---|---|---|---|---|---|---|
| HOG | 4002 | 10 | 826 | 0 | 0 | 1481 | 0 | 256 | 290 | 16 | | |
| | 15 | 23 | 3 | 0000 | 0 | 0 | 1 | 0 | 0 | 12 | | |
| TRIM CODE | 2131 | 2221 | 2231 | 2321 | 2122 | 2331 | 1131 | 1221 | 1231 | 1321 | 1122 | 1331 |
| CUT CODE | 1905 | 0505 | 1905 | 0505 | 0505 | 1905 | 1905 | 0A05 | 1905 | 0A05 | 0A05 | 1905 |
| REL COST | 0 | 1 | 2 | 3 | 5 | 5 | 26 | 27 | 29 | 30 | 31 | 31 |
| SENTRY(I,1) | 33 | 33 | 33 | 33 | 33 | 33 | 33 | 33 | 33 | 33 | 33 | 33 |
| SENTRY(I,2) | 50 | 25 | 25 | 25 | 50 | 25 | 50 | 25 | 25 | 25 | 50 | 25 |
| BASE WTS | 1533 | 1452 | 1673 | 1595 | 1658 | 2466 | 1450 | 5771 | 0 | 0 | 0 | 0 |
| COEF | 1.2154 | 1.3763 | 1.1996 | -0.9498 | -0.8933 | -1.1955 | -1.4398 | -1.0817 | -1.5462 | 2.2659 | 0.0000 | 0.0000 |

| | | | | | | | | | | | | |
|---|---|---|---|---|---|---|---|---|---|---|---|---|
| HOG | 1937 | 11 | 826 | 0 | 0 | 1730 | 0 | 261 | 328 | 17 | | |
| | 13 | 22 | 2 | 0000 | 0 | 0 | 1 | 0 | 0 | 12 | | |
| TRIM CODE | 2142 | 2341 | 2242 | 2232 | 2332 | 2133 | 1132 | 1331 | 1232 | 1332 | 1133 | 2132 |
| CUT CODE | 1905 | 1905 | 1905 | 0505 | 0505 | 0505 | 1905 | 1905 | 1905 | 0505 | 0505 | 0519 |
| REL COST | 0 | 12 | 13 | 15 | 17 | 24 | 26 | 38 | 39 | 47 | 53 | 84 |
| SENTRY(I,1) | 33 | 33 | 33 | 25 | 25 | 25 | 20 | 20 | 20 | 20 | 20 | 25 |
| SENTRY(I,2) | 33 | 50 | 33 | 33 | 50 | 50 | 33 | 50 | 33 | 50 | 50 | 33 |
| BASE WTS | 1705 | 1630 | 1849 | 1874 | 2032 | 2868 | 1684 | 6715 | 0 | 0 | 0 | 0 |
| COEF | 1.4055 | 1.4305 | 1.4013 | -0.9683 | -0.8933 | -1.2189 | -1.5298 | -1.2234 | -1.5764 | 2.6469 | 0.0000 | 0.0000 |

| | | | | | | | | | | | | |
|---|---|---|---|---|---|---|---|---|---|---|---|---|
| HOG | 8730 | 12 | 826 | 0 | 0 | 1596 | 0 | 271 | 319 | 13 | | |
| | 11 | 22 | 2 | 0000 | 0 | 0 | 1 | 0 | 0 | 12 | | |
| TRIM CODE | 2142 | 2232 | 2341 | 2242 | 2332 | 2133 | 1142 | 1341 | 1242 | 1232 | 1332 | 1133 |
| CUT CODE | 1905 | 0505 | 1905 | 1905 | 0505 | 0505 | 1905 | 1905 | 1905 | 0505 | 0505 | 0505 |
| REL COST | 0 | 1 | 2 | 3 | 3 | 20 | 22 | 24 | 25 | 26 | 28 | 45 |
| SENTRY(I,1) | 33 | 33 | 33 | 33 | 33 | 33 | 33 | 33 | 33 | 33 | 33 | 33 |
| SENTRY(I,2) | 50 | 25 | 50 | 25 | 50 | 50 | 50 | 50 | 25 | 25 | 50 | 50 |
| BASE WTS | 1699 | 1646 | 1915 | 1852 | 1942 | 2623 | 1594 | 6341 | 0 | 0 | 0 | 0 |
| COEF | 1.2741 | 1.5423 | 1.2928 | -1.0054 | -0.8933 | -1.2656 | -1.1699 | -1.1899 | -1.6368 | 2.4419 | 0.0000 | 0.0000 |

HOG 2303 13 826 0 0 1774 0 268 312 13
15 18 2 0000 0 0 1 0 0 12

| | | | | | | | | | | | | |
|---|---|---|---|---|---|---|---|---|---|---|---|---|
| TRIM CODE | 2242 | 2142 | 2342 | 2332 | 2233 | 2133 | 1242 | 1142 | 1342 | 1332 | 1233 | 1133 |
| CUT CODE | 1905 | 1905 | 1905 | 0505 | 0505 | 0505 | 1905 | 1905 | 1905 | 0505 | 0505 | 0505 |
| REL COST | 0 | 1 | 2 | 3 | 19 | 24 | 26 | 27 | 28 | 29 | 45 | 50 |
| SENTRY(I,1) | 33 | 33 | 33 | 33 | 33 | 33 | 33 | 33 | 33 | 33 | 33 | 33 |
| SENTRY(I,2) | 50 | 50 | 25 | 25 | 50 | 50 | 50 | 50 | 25 | 25 | 50 | 50 |
| BASE WTS | 1757 | 1716 | 1988 | 1917 | 1981 | 2895 | 1769 | 4973 | 0 | 0 | 0 | 0 |
| COEF | 1.4041 | 1.5083 | 1.4369 | -0.9943 | -0.8933 | -1.2516 | -1.1699 | -1.1638 | -1.6187 | 2.7142 | 0.0000 | 0.0000 |

HOG 9076 14 826 0 0 1540 0 252 312 12
12 21 2 0000 0 0 1 0 0 12

| | | | | | | | | | | | | |
|---|---|---|---|---|---|---|---|---|---|---|---|---|
| TRIM CODE | 2132 | 2231 | 2222 | 2331 | 2322 | 2123 | 1132 | 1122 | 1231 | 1321 | 1222 | 1331 |
| CUT CODE | 1905 | 1905 | 0505 | 1905 | 0505 | 0505 | 1905 | 0805 | 1905 | 0805 | 0805 | 1905 |
| REL COST | 0 | 6 | 9 | 9 | 11 | 19 | 23 | 24 | 30 | 30 | 31 | 32 |
| SENTRY(I,1) | 33 | 33 | 33 | 33 | 33 | 33 | 33 | 33 | 33 | 33 | 33 | 33 |
| SENTRY(I,2) | 33 | 50 | 50 | 33 | 100 | 100 | 33 | 33 | 50 | 33 | 50 | 33 |
| BASE WTS | 1494 | 1449 | 1648 | 1724 | 1875 | 2562 | 1550 | 6007 | 0 | 0 | 0 | 0 |
| COEF | 1.2249 | 1.3336 | 1.2474 | -0.9349 | -0.8933 | -1.1768 | -1.0799 | -1.1638 | -1.5221 | 2.3562 | 0.0000 | 0.0000 |

MAXIMUM HAM AVAILABILITY BY RELATIVE COST HF055

| 14/DW | | 14/17 | | 17/20 | | 20/26 | | 26/UP | | |
|---|---|---|---|---|---|---|---|---|---|---|
| CM | GW | CM | GW | CM | GW | CM | GW | CM | GW | |
| 0.00 | 0.25 | 0.00 | 0.45 | 0.00 | 1.98 | 0.00 | 1.98 | 0.00 | 0.00 | 0 |
| 0.00 | 0.00 | 0.00 | 0.33 | 0.00 | 0.33 | 0.00 | 0.33 | 0.00 | 0.00 | 1 |
| 0.00 | 0.00 | 0.00 | 0.00 | 0.00 | 0.33 | 0.00 | 1.32 | 0.00 | 0.00 | 2 |
| 0.00 | 0.00 | 0.00 | 0.53 | 0.00 | 1.65 | 0.00 | 0.33 | 0.00 | 0.00 | 3 |
| 0.00 | 0.00 | 0.00 | 0.00 | 0.00 | 0.00 | 0.00 | 0.00 | 0.00 | 0.00 | 4 |
| 0.00 | 0.00 | 0.00 | 0.78 | 0.00 | 0.99 | 0.00 | 0.00 | 0.00 | 0.00 | 5 |
| 0.00 | 0.25 | 0.00 | 0.33 | 0.00 | 0.66 | 0.00 | 0.00 | 0.00 | 0.00 | 6 |
| 0.00 | 0.00 | 0.00 | 0.45 | 0.00 | 0.33 | 0.00 | 0.33 | 0.00 | 0.00 | 7 |
| 0.00 | 0.00 | 0.00 | 0.99 | 0.00 | 0.33 | 0.00 | 0.00 | 0.00 | 0.00 | 8 |
| 0.00 | 0.00 | 0.00 | 0.33 | 0.00 | 0.66 | 0.00 | 0.00 | 0.00 | 0.00 | 9 |
| 0.00 | 0.00 | 0.00 | 0.00 | 0.00 | 0.00 | 0.00 | 0.00 | 0.00 | 0.00 | 10 |
| 0.00 | 0.00 | 0.00 | 0.66 | 0.00 | 0.00 | 0.00 | 0.00 | 0.00 | 0.00 | 11 |
| 0.00 | 0.00 | 0.00 | 0.00 | 0.00 | 0.33 | 0.00 | 0.66 | 0.00 | 0.00 | 12 |
| 0.00 | 0.00 | 0.00 | 0.00 | 0.00 | 0.00 | 0.00 | 0.33 | 0.00 | 0.00 | 13 |
| 0.00 | 0.00 | 0.00 | 0.00 | 0.00 | 0.00 | 0.00 | 0.33 | 0.00 | 0.00 | 14 |
| 0.00 | 0.00 | 0.58 | 0.00 | 0.00 | 0.25 | 0.00 | 0.00 | 0.00 | 0.00 | 15 |
| 0.00 | 0.00 | 0.25 | 0.00 | 0.33 | 0.00 | 0.00 | 0.33 | 0.00 | 0.00 | 16 |
| 0.00 | 0.00 | 0.25 | 0.00 | 0.33 | 0.25 | 0.00 | 0.00 | 0.00 | 0.00 | 17 |
| 0.00 | 0.50 | 0.00 | 0.00 | 0.66 | 0.33 | 0.00 | 0.00 | 0.00 | 0.00 | 18 |
| 0.00 | 0.00 | 0.00 | 0.99 | 0.33 | 0.66 | 0.00 | 0.00 | 0.00 | 0.00 | 19 |
| 0.00 | 0.00 | 0.00 | 0.58 | 0.66 | 0.99 | 0.00 | 0.00 | 0.00 | 0.00 | 20 |
| 0.25 | 0.00 | 0.00 | 0.09 | 0.33 | 0.66 | 0.00 | 0.00 | 0.00 | 0.00 | 21 |
| 0.00 | 0.25 | 0.25 | 0.00 | 0.33 | 0.00 | 0.66 | 0.00 | 0.00 | 0.00 | 22 |
| 0.00 | 0.00 | 0.33 | 0.33 | 0.66 | 0.00 | 0.00 | 0.00 | 0.00 | 0.00 | 23 |
| 0.00 | 0.25 | 0.66 | 0.00 | 0.66 | 0.58 | 0.99 | 0.00 | 0.00 | 0.00 | 24 |
| 0.00 | 0.00 | 0.00 | 0.00 | 0.66 | 0.00 | 0.33 | 0.00 | 0.00 | 0.00 | 25 |
| 0.00 | 0.00 | 1.16 | 0.00 | 1.52 | 0.00 | 0.33 | 0.00 | 0.00 | 0.00 | 26 |
| 0.00 | 0.00 | 0.33 | 0.00 | 0.66 | 0.00 | 0.33 | 0.00 | 0.00 | 0.00 | 27 |
| 0.00 | 0.00 | 0.66 | 0.00 | 0.33 | 0.33 | 0.33 | 0.00 | 0.00 | 0.00 | 28 |
| 0.25 | 0.00 | 0.50 | 0.00 | 0.66 | 0.00 | 0.00 | 0.00 | 0.00 | 0.00 | 29 |
| 0.00 | 0.00 | 0.66 | 0.00 | 0.33 | 0.00 | 0.00 | 0.00 | 0.00 | 0.00 | 30 |
| 0.00 | 0.00 | 0.66 | 0.00 | 0.33 | 0.00 | 0.00 | 0.00 | 0.00 | 0.00 | 31 |
| 0.00 | 0.00 | 0.33 | 0.00 | 0.33 | 0.00 | 0.00 | 0.00 | 0.00 | 0.00 | 32 |
| 0.00 | 0.00 | 0.00 | 0.00 | 0.00 | 0.00 | 0.00 | 0.00 | 0.00 | 0.00 | 33 |
| 0.00 | 0.00 | 0.00 | 0.00 | 0.00 | 0.00 | 0.00 | 0.00 | 0.00 | 0.00 | 34 |
| 0.00 | 0.00 | 0.00 | 0.00 | 0.00 | 0.00 | 0.00 | 0.00 | 0.00 | 0.00 | 35 |
| 0.00 | 0.00 | 0.00 | 0.00 | 0 00 | 0.00 | 0.66 | 0.00 | 0.00 | 0.00 | 36 |
| 0.00 | 0.00 | 0.00 | 0.00 | 0.00 | 0.00 | 0.00 | 0.00 | 0.00 | 0.00 | 37 |
| 0.00 | 0.00 | 0.33 | 0.00 | 0.20 | 0.00 | 0.00 | 0.00 | 0.00 | 0.00 | 38 |
| 0.50 | 0.00 | 0.79 | 0.00 | 3.57 | 0.25 | 0.33 | 0.00 | 0.00 | 0.00 | 39 |
| 1. | 1. | 8. | 7. | 13. | 12. | 4. | 6. | 0. | 0. | |

HAM NEEDS

| | | | | | | | | | | |
|---|---|---|---|---|---|---|---|---|---|---|
| 0 | 1 | 0 | 2 | 0 | 5 | 0 | 6 | 0 | 0 | MIN |
| 0 | 1 | 0 | 2 | 0 | 5 | 0 | 6 | 0 | 0 | MAX |

MAXIMUM LOIN AVAILABILITY BY RELATIVE COST HF055

| 14/DW | | | 14/17 | | | 17/20 | | | 20/UP | | | |
|---|---|---|---|---|---|---|---|---|---|---|---|---|
| CM | GW | BL | CM | GW | BL | CM | GW | BL | CM | GW | BL | |
| 1.00 | 0.50 | 0.00 | 3.48 | 1.50 | 0.50 | 0.00 | 0.00 | 0.00 | 0.00 | 0.00 | 0.00 | 0 |
| 0.00 | 0.25 | 0.00 | 0.50 | 0.25 | 0.00 | 0.00 | 0.00 | 0.00 | 0.00 | 0.00 | 0.00 | 1 |
| 0.00 | 0.25 | 0.50 | 0.00 | 0.00 | 1.00 | 0.00 | 0.00 | 0.00 | 0.00 | 0.00 | 0.00 | 2 |
| 0.00 | 1.00 | 0.58 | 0.00 | 0.25 | 1.00 | 0.00 | 0.00 | 0.00 | 0.00 | 0.00 | 0.00 | 3 |
| 0.00 | 0.00 | 0.00 | 0.00 | 0.00 | 0.00 | 0.00 | 0.00 | 0.00 | 0.00 | 0.00 | 0.00 | 4 |
| 0.00 | 0.00 | 1.25 | 0.50 | 1.00 | 0.00 | 0.00 | 0.00 | 0.00 | 0.00 | 0.00 | 0.00 | 5 |
| 0.00 | 0.50 | 0.50 | 0.50 | 0.50 | 0.00 | 0.00 | 0.00 | 0.00 | 0.00 | 0.00 | 0.00 | 6 |
| 0.00 | 0.00 | 0.00 | 0.00 | 0.50 | 1.00 | 0.25 | 0.00 | 0.00 | 0.00 | 0.00 | 0.00 | 7 |
| 0.00 | 0.00 | 0.50 | 0.00 | 0.25 | 1.00 | 0.00 | 0.00 | 0.00 | 0.00 | 0.00 | 0.00 | 8 |
| 0.00 | 0.00 | 0.33 | 0.00 | 0.75 | 0.00 | 0.00 | 0.00 | 0.00 | 0.00 | 0.00 | 0.00 | 9 |
| 0.00 | 0.00 | 0.00 | 0.00 | 0.00 | 0.00 | 0.00 | 0.00 | 0.00 | 0.00 | 0.00 | 0.00 | 10 |
| 0.00 | 0.00 | 0.00 | 0.00 | 0.00 | 1.50 | 0.00 | 0.00 | 0.00 | 0.00 | 0.00 | 0.00 | 11 |
| 0.00 | 0.00 | 0.50 | 0.00 | 0.00 | 0.00 | 0.75 | 0.00 | 0.00 | 0.00 | 0.00 | 0.00 | 12 |
| 0.00 | 0.00 | 0.00 | 0.00 | 0.33 | 0.00 | 0.00 | 0.00 | 0.00 | 0.00 | 0.00 | 0.00 | 13 |
| 0.00 | 0.00 | 0.00 | 0.00 | 0.00 | 0.00 | 0.25 | 0.00 | 0.00 | 0.00 | 0.00 | 0.00 | 14 |
| 0.00 | 0.00 | 0.00 | 0.66 | 0.33 | 0.00 | 0.00 | 0.00 | 0.00 | 0.00 | 0.00 | 0.00 | 15 |
| 0.00 | 0.00 | 0.33 | 0.33 | 0.00 | 0.00 | 0.00 | 0.25 | 0.00 | 0.00 | 0.00 | 0.00 | 16 |
| 0.00 | 0.50 | 0.00 | 0.00 | 0.50 | 0.50 | 0.00 | 0.00 | 0.00 | 0.00 | 0.00 | 0.00 | 17 |
| 0.00 | 0.00 | 0.00 | 0.83 | 0.00 | 0.00 | 0.00 | 0.50 | 0.00 | 0.00 | 0.00 | 0.00 | 18 |
| 0.00 | 0.00 | 0.33 | 0.00 | 0.00 | 0.00 | 2.50 | 1.00 | 0.00 | 0.00 | 0.00 | 0.00 | 19 |
| 0.00 | 0.00 | 0.00 | 0.50 | 0.50 | 0.00 | 2.25 | 0.25 | 0.00 | 0.00 | 0.00 | 0.00 | 20 |
| 0.50 | 0.00 | 0.00 | 0.33 | 0.00 | 0.00 | 0.00 | 0.00 | 1.00 | 0.00 | 0.00 | 0.00 | 21 |
| 0.00 | 0.50 | 0.00 | 0.50 | 0.50 | 0.75 | 0.00 | 0.00 | 0.00 | 0.00 | 0.00 | 0.00 | 22 |
| 0.00 | 0.50 | 0.00 | 0.33 | 0.00 | 0.25 | 0.00 | 0.50 | 0.00 | 0.00 | 0.00 | 0.00 | 23 |
| 0.00 | 0.50 | 1.50 | 0.33 | 0.25 | 1.00 | 1.00 | 0.00 | 0.00 | 0.00 | 0.00 | 0.00 | 24 |
| 0.00 | 0.00 | 0.50 | 0.00 | 0.75 | 0.00 | 0.00 | 0.00 | 0.00 | 0.00 | 0.00 | 0.00 | 25 |
| 0.50 | 0.00 | 0.50 | 0.33 | 1.75 | 0.50 | 0.25 | 0.00 | 0.00 | 0.00 | 0.00 | 0.00 | 26 |
| 0.00 | 0.25 | 0.50 | 0.50 | 0.25 | 0.00 | 0.00 | 0.00 | 0.00 | 0.00 | 0.00 | 0.00 | 27 |
| 0.00 | 0.00 | 0.00 | 0.00 | 0.00 | 1.75 | 0.00 | 0.00 | 0.00 | 0.50 | 0.00 | 0.00 | 28 |
| 0.00 | 0.25 | 0.00 | 0.50 | 0.00 | 0.75 | 0.00 | 0.00 | 0.00 | 0.00 | 0.00 | 0.00 | 29 |
| 0.00 | 0.50 | 0.58 | 0.00 | 0.00 | 0.00 | 0.00 | 0.00 | 0.00 | 0.00 | 0.00 | 0.00 | 30 |
| 0.00 | 0.00 | 0.25 | 0.50 | 0.50 | 0.00 | 0.00 | 0.00 | 0.00 | 0.00 | 0.00 | 0.00 | 31 |
| 0.00 | 0.00 | 0.33 | 0.00 | 0.00 | 0.00 | 0.25 | 0.00 | 0.00 | 0.00 | 0.00 | 0.00 | 32 |
| 0.00 | 0.00 | 0.00 | 0.00 | 0.00 | 0.00 | 0.00 | 0.00 | 0.00 | 0.00 | 0.00 | 0.00 | 33 |
| 0.00 | 0.00 | 0.00 | 0.00 | 0.00 | 0.00 | 0.00 | 0.00 | 0.00 | 0.00 | 0.00 | 0.00 | 34 |
| 0.00 | 0.00 | 0.00 | 0.00 | 0.00 | 0.00 | 0.00 | 0.00 | 0.00 | 0.00 | 0.00 | 0.00 | 35 |
| 0.00 | 0.00 | 0.00 | 0.00 | 0.00 | 0.00 | 0.75 | 0.00 | 0.00 | 0.00 | 0.00 | 0.00 | 36 |
| 0.00 | 0.00 | 0.00 | 0.00 | 0.00 | 0.00 | 0.00 | 0.00 | 0.00 | 0.00 | 0.00 | 0.00 | 37 |
| 0.00 | 0.00 | 0.50 | 0.00 | 0.00 | 0.00 | 0.00 | 0.50 | 0.00 | 0.00 | 0.00 | 0.00 | 38 |
| 0.00 | 0.50 | 0.50 | 0.33 | 0.33 | 0.50 | 2.75 | 2.00 | 1.00 | 0.50 | 0.00 | 0.00 | 39 |
| 2. | 6. | 10. | 11. | 11. | 12. | 11. | 5. | 2. | 1. | 0. | 0. | |

LOIN NEEDS 2 0 0 8 3 1 0 0 0 0 0 OMAX
2 0 0 8 3 1 0 0 0 0 0 OMIN

CUTFILE DATA RECORD

HF MOD 1φφ Appendix B

| | | | | | | | | | | |
|---|---|---|---|---|---|---|---|---|---|---|
| Hog ID 1 | Seq. No. 2 | Kill Day (Julian) | Tatoo No. 4 | PEV WGT 5 | HOT WGT 6 | CHILL WGT 7 | CIRC 8 | LENG 9 | LLBF 10 | Page 1 |
| LRBF 11 | FRBF 12 | MQ 13 | Status Word 14 | Charac-teristic 15 | Dispo-sition 16 | Sex 17 | 18 | Option Select 19 | No. Options 20 Gen. | |

| | | | | | | | | | | | |
|---|---|---|---|---|---|---|---|---|---|---|---|
| 21 | | | | | | | | | | | 32 |

TRIM CODES

| | | | | | | | | | | | |
|---|---|---|---|---|---|---|---|---|---|---|---|
| 33 | | | | | | | | | | | |

CUT CODES

| | | | | | | | | | | | |
|---|---|---|---|---|---|---|---|---|---|---|---|
| 45 | | | | | | | | | | | |

REL COSTS

| | | | | | | | | | | | |
|---|---|---|---|---|---|---|---|---|---|---|---|
| 57 | | | | | | | | | | | |

I ENTRY

| | | | | | | | | | | | |
|---|---|---|---|---|---|---|---|---|---|---|---|
| (1,1) 69 | (2,1) | (3,1) | (4,1) | (5,1) | (6,1) | (7,1) | (8,1) | (9,1) | (10,1) | (11,1) | (12,1) |
| (1,2) 81 | (2,2) | (3,2) | (4,2) | (5,2) | (6,2) | (7,2) | (8,2) | (9,2) | (10,2) | (11,2) | (12,2) |
| BGH 93 | BCH | BRH | BGL | BCL | BRL | BRS | MAXYU | | | | |
| Ham 105 G | ACH W | Ham COM | ACH | Ham ROUGH | ACH | Loin G | ACH W | Loin COM | ACH | Loin ROUGH | ACH |
| Loin 117 G | SC W | Loin COM | SC | Loin ROUGH | SC | SHOL ROUGH | SC | | | | 128 |

APPENDIX B

1. HOG ID—Unique hog carcass identification number
2. SEQ. NO.—Kill sequence number
3. KILL DAY—Julian kill date
4. TATTOO NO.—Tattoo or lot number stamped on hog
5. PEV WGT—Hog weight after dehairing before evisceration
6. HOT WT—Hot dressed carcass weight
7. CHILL WT—Chilled dressed carcass weight
8. CIRC—Ham circumference
9. LENG—Carcass body length
10. LLBF—Last lumbar backfat depth
11. LRBF—Last rib backfat depth
12. FRBF—First rib backfat depth
13. MQ—Subjective muscle evaluation
14. STATUS WORD—Indicates validity of measurements
15. CHARACTERISTIC—Code number from 0-5
    0—No unusual characteristic
    1—Tuberculosis
    2—Sow or heavy
    3—Not used
    4—Mutilated carcass (arthritic)
    5—Selected for Smithfield
16. DISPOSITION—Code number from 0-5
    0—No abnormal disposition
    1—Carcass was condemned
    2—Carcass was doubled with another on chill scale
    3—Hot carcass to be boned-out
    4—Carcass sold as dressed carcass
    5—Carcass fell from rail before chill scale.
17. SEX—Code 1—male, 2=female
18.—Not used
19. OPTION SELECT—Option number chosen by system
20. NO. OPTIONS GEN.—Number of options generated for this hog.

21.—32 NOT USED

33.—44 TRIM CODES/A/B/C/D/

A

1—Commodity ham
2—Gwaltney Ham

B.

1-14/Dn Weight Range
2-14/17 Weight Range
3-17/20 Weight Range
4-20/26 Weight Range
5-26/up Weight Range C
1—Commodity Loin
2—Gwaltney Loin
3—Bladeless Loin
D
1-14/Dn Weight Range
2-17/17 Weight Range
3-17/20 Weight Range
4-20/up Weight Range
45-56 CUT CODES/AA/BB/
AA—Hexadecimal aitch cut distance in tenths of inches.
BB—Hexadecimal shoulder cut distance in tenths of inches.
57.-68 RELATIVE COST OF OPTIONS
69.-80 WEIGHT FACTORS FOR HAMS
81.-92 WEIGHT FACTORS FOR LOINS
93. BGH—Base Gwaltney Ham Weight
94. BCH—Base Commodity Ham Weight
95. BRH—Base Rough Ham Weight
96. BGL—Base Gwaltney Loin Weight
97. BCL—Base Commodity Loin Weight
98. BRL—Base Rough Loin Weight
99. BRS—Base Rough Shoulder Weight
100. MAX YLD—Maximum Primal Weight available from this hog.
101.-104—NOT USED 105. HAM ACH GW—Rate of change of Gwaltney Ham, weight per inch of aitch cut
107. HAM ACH COM—Rate of change of commodity ham, weight per inch of aitch cut
109. HAM ACH ROUGH—Rate of change of rough ham, weight per inch of aitch cut
111. LOIN ACH GW—Rate of change of Gwaltney loin, weight per inch of aitch cut.
113. LOIN ACH COM—Rate of change of commodity loin, weight per inch of ACH cut
115. LOIN ACH ROUGH—Rate of change of rough loin, weight per inch of ACH cut
117. Loin SC Gw—Rate of change of Gwaltney loin, weight per inch of Shoulder cut
119. LOIN SC COM—Rate of change of commodity loin, weight per inch of shoulder cut
121. LOIN SC ROUGH—Rate of change of rough loin, weight per inch of shoulder cut
123. SHOL SC ROUGH—Rate of change of rough shoulder, weight per inch of shoulder cut
125.—128—No used

I claim:

1. A method for optimizing the value of finished cuts obtained from each individual carcass in a series of carcasses to be processed in a given period of time into said finished cuts, where said series of carcasses progress through a killing department, a chilling department and a cutting department in that order, said method comprising the step of:
identifying each of said carcasses with at least one different alphanumeric type indicia promptly after the kill in said killing department;
measuring selected predetermined physical variables of each of said carcasses in said killing department;
coupling said indicia and said measurements of each of said carcasses to a computer for storage therein;
determining current market indicators and production information when said carcasses are in said chilling department;
coupling said market indicators and production information to said computer for storage therein;
employing said computer to determine from said measurements and the results of said determining step optimum carcass cutting instructions for each of said carcasses; and
utilizing said indicia of each of said carcasses in said cutting department to retrieve said cutting instructions from said computer for each of said carcasses to effect optimization of said value of said finished cuts produced from each of said carcasses and thereby optimize said value of said finished cuts produced from said series of carcasses.

2. A method according to claim 1, further including the step of:
including in said measuring step, the step of weighing each of said carcasses in said killing department.

3. A method according to claim 2, wherein
said step of determining includes at least a selected one of the steps of
determining the market price of each of said ham, loin and shoulder cuts,
determining the market demand for each of said ham, loin and shoulder cuts,
determining the market demand for each of a lean, specially trim and a commodity trim,
determining the market price for each weight range of said ham, loin and shoulder cuts,
determining the market demand for each weight range of said ham, loin and shoulder cuts,
determining the market price for all special trims,
determining the market demand for said special trims, and
determining the quantity of special trim orders which are actual and predicted quantities.

4. A method according to claim 3, wherein
said step of measuring includes
weighing each of said carcasses before and after dressing,
measuring the ham circumference and carcass length,
measuring the backfat thickness, and
evaluating the muscle quality to provide a subjective muscle score value.

5. A method according to claim 4 further including the steps of
coupling said indicia and the weight, measured and evaluated values of each of said carcasses separately to said computer and storing said values and said indicia therein.

6. A method according to claim 5, wherein
said step of measuring said backfat thickness includes the steps of measuring said backfat thickness at the first rib, the last rib and at the last lumbar.

7. A method according to claim 6, wherein
said step of utilizing includes
the step of indicating the cutting point for each of said carcasses side for optimized ham, loin and shoulder cuts.

8. A method according to claim 1 for use in processing hog carcasses, further including in said utilizing step the step of:
cutting each of said carcasses a predetermined calculated distance from the aitch bone and a calculated distance from a shoulder reference point, which is the anterior edges of the first rib at the juncture of the first thoracic vertebrae, to effect said optimization of ham and loin cut.

9. A method according to claim 8, wherein said predetermined distance is 0.5 to 3.0 inches forward of the aitch bone and said given distance is 0.5 to 3.0 inches forward of said shoulder reference point.

10. A method according to claim 1, further including the step of weighing each of said carcasses in said cutting department and coupling the result of this step and said indicia for each of said carcasses separately to said computer to effect said optimization of ham, loin and shoulder cuts.

11. A method according to claim 10, wherein said step of determining includes at least a selected one of the steps of determining the market price of each of said ham, loin and shoulder cuts, determining the market demand for each of said ham, loin and shoulder cuts, determining the market demand for each of a lean, speciality trim and a commodity trim, determining the market price for each weight range of said ham, loin and shoulder cuts, determining the market demand for each weight range of said ham, loin and shoulder cuts, determining the market price for all special trims, determining the market demand for said special trims, determining the quantity of special trim and orders which are actual and predicted quantities.

12. A method according to claim 13, wherein said step of measuring includes weighing each of said carcasses side before and after dressing, measuring the ham circumference and carcass length, measuring the backfat thickness, and

13. A method according to claim 12, further including the steps of coupling said indicia and the weight, evaluated and measured values of each of said carcasses specialty to said computer and storing said values and said indicia therein.

14. A method according to claim 13, wherein said step of measuring said backfat thickness includes the steps of measuring said backfat thickness at the first rib, the last rib and at the last lumbar.

15. A method according to claim 14, wherein said step of utilizing includes the step of indicating the cutting point for each of said carcasses for optimized ham, loin and shoulder cuts.

16. A method according to claim 8, wherein said step of determining includes at least two or more of the steps of:

determining the market price of each of said ham, loin and shoulder cuts, determining the market demand for each of said ham, loin and shoulder cuts, determining the market demand for each of a lean, specialty trim and a commodity trim, determining the market price for each weight range of said ham, loin and shoulder cuts, determining the market demand for each weight range of said ham, loin and shoulder cuts, determining the market pr for all special trims, determining the market demand for said special trims, and determining the quantity of special trim orders which are actual and predicted quantities.

17. A method according to claim 16, wherein said step of measuring includes weighing each of said carcasses before and after dressing, measuring the ham circumference and carcass length, measuring the backfat thickness, and measuring the muscle quality.

18. A method according to claim 17, further including the steps of coupling said indicia and the weight and measured values of each of said carcasses specialty to said computer and storing said values and said indicia therein.

19. A method according to claim 18, wherein said step of measuring said backfat thickness includes the steps of measuring said backfat thickness at the first rib, the last rib and at the last lumbar.

* * * * *